(12) United States Patent
Randall et al.

(10) Patent No.: US 8,392,826 B2
(45) Date of Patent: Mar. 5, 2013

(54) METHODS AND SYSTEMS FOR USE IN MAINTAINING MEDIA DATA QUALITY UPON CONVERSION TO A DIFFERENT DATA FORMAT

(75) Inventors: Bruce W. Randall, Corte Madera, CA (US); James H. Taylor, Fox Island, WA (US); Mark N. Ely, Kentfield, CA (US); Kenneth G. Oetzel, San Rafael, CA (US)

(73) Assignee: Sonic Solutions LLC, Santa Clara, CA (US)

( * ) Notice: Subject to any disclaimer, the term of this patent is extended or adjusted under 35 U.S.C. 154(b) by 839 days.

(21) Appl. No.: 12/491,198

(22) Filed: Jun. 24, 2009

(65) Prior Publication Data

US 2009/0265617 A1   Oct. 22, 2009

Related U.S. Application Data

(63) Continuation of application No. 11/258,677, filed on Oct. 25, 2005, now Pat. No. 7,555,715.

(51) Int. Cl.
*G06F 17/00* (2006.01)
(52) U.S. Cl. ......... 715/249; 715/248; 715/250; 715/255
(58) Field of Classification Search ........... 715/248–250
See application file for complete search history.

(56) References Cited

U.S. PATENT DOCUMENTS

| | | | |
|---|---|---|---|
| 4,000,510 A | 12/1976 | Cheney et al. | |
| 4,386,375 A | 5/1983 | Altman | |
| 4,602,907 A | 7/1986 | Foster | |
| 4,672,572 A | 6/1987 | Alsberg | |
| 4,709,813 A | 12/1987 | Wildt | |
| 4,710,754 A | 12/1987 | Montean | |
| 4,739,510 A | 4/1988 | Jeffers et al. | |
| 4,775,935 A | 10/1988 | Yourick | |
| 4,785,472 A | 11/1988 | Shapiro | |
| 4,798,543 A | 1/1989 | Spiece | |
| 4,804,328 A | 2/1989 | Barrabee | |
| 4,863,384 A | 9/1989 | Slade | |
| 4,888,638 A | 12/1989 | Bohn | |
| 4,967,185 A | 10/1990 | Montean | |
| 4,993,068 A | 2/1991 | Piosenka et al. | |
| 5,023,907 A | 6/1991 | Johnson et al. | |
| 5,109,482 A | 4/1992 | Bohrman | |

(Continued)

FOREIGN PATENT DOCUMENTS

| | | |
|---|---|---|
| DE | 42 42 992 | 6/1994 |
| EP | 0 372 716 | 6/1990 |

(Continued)

OTHER PUBLICATIONS

Notice of Allowance from 11258677 mailed Feb. 24, 2009 (86621).

(Continued)

*Primary Examiner* — Chau Nguyen
(74) *Attorney, Agent, or Firm* — Schwegman Lundberg & Woessner, P.A.

(57) ABSTRACT

The present embodiments provide methods, apparatuses, and systems for use in maintaining data quality upon conversion to a different data format. Some embodiments provide methods that receive media data in a first format, initiate a first conversion of the media data at the first format to a second converted format, identify parameters dictating the conversion to the second converted format, record the parameters, and distribute the recorded parameters to remote systems such that the parameters at least in part control the remote systems during a conversion of the media data to the second converted format.

13 Claims, 9 Drawing Sheets

U.S. PATENT DOCUMENTS

| | | | |
|---|---|---|---|
| 5,128,752 | A | 7/1992 | Von Kohorn |
| 5,289,439 | A | 2/1994 | Koulopoulos et al. |
| 5,305,195 | A | 4/1994 | Murphy |
| 5,305,197 | A | 4/1994 | Axler et al. |
| 5,347,508 | A | 9/1994 | Montbriand et al. |
| 5,353,218 | A | 10/1994 | De Lapa et al. |
| 5,400,402 | A | 3/1995 | Garfinkle |
| 6,320,667 | B1 * | 11/2001 | Mitsuhashi .................... 358/1.1 |
| 6,407,745 | B1 | 6/2002 | Yamada et al. |
| 6,460,180 | B1 | 10/2002 | Park et al. |
| 6,573,907 | B1 | 6/2003 | Madrane |
| 6,615,408 | B1 | 9/2003 | Kaiser et al. |
| 6,791,907 | B2 | 9/2004 | Berhan |
| 6,865,746 | B1 | 3/2005 | Herrington et al. |
| 7,188,193 | B1 | 3/2007 | Getsin |
| 7,315,829 | B1 * | 1/2008 | Tagawa et al. ............... 705/26.1 |
| 7,448,021 | B1 | 11/2008 | Lamkin |
| 7,458,091 | B1 | 11/2008 | Getsin |
| 7,555,715 | B2 | 6/2009 | Randall et al. |
| 2001/0005903 | A1 | 6/2001 | Goldschmidt Iki et al. |
| 2002/0107865 | A1 | 8/2002 | Rotem et al. |
| 2003/0007784 | A1 | 1/2003 | Loui et al. |
| 2003/0052911 | A1 * | 3/2003 | Cohen-solal .................. 345/738 |
| 2003/0193520 | A1 | 10/2003 | Oetzel |
| 2003/0227474 | A1 | 12/2003 | Oetzel et al. |
| 2004/0042550 | A1 * | 3/2004 | Nozawa ................... 375/240.12 |
| 2004/0136698 | A1 | 7/2004 | Mock |
| 2004/0212731 | A1 * | 10/2004 | Sie et al. ....................... 348/445 |
| 2004/0220926 | A1 | 11/2004 | Lamkin et al. |
| 2005/0246745 | A1 | 11/2005 | Hirsch |
| 2005/0265701 | A1 | 12/2005 | Lamkin et al. |
| 2005/0273791 | A1 * | 12/2005 | Evans et al. ................... 719/328 |
| 2005/0278435 | A1 | 12/2005 | Lamkin et al. |
| 2005/0278729 | A1 | 12/2005 | Lamkin et al. |
| 2006/0004778 | A1 | 1/2006 | Lamkin et al. |
| 2006/0184538 | A1 * | 8/2006 | Randall et al. .................. 707/10 |

FOREIGN PATENT DOCUMENTS

| | | |
|---|---|---|
| EP | 0 762 422 | 3/1997 |
| EP | 0762422 A2 | 3/1997 |
| EP | 0 802 527 | 10/1997 |
| EP | 0802527 A1 | 10/1997 |
| EP | 0 809 244 | 11/1997 |
| EP | 0809244 A2 | 11/1997 |
| EP | 0 814 419 | 12/1997 |
| EP | 0814419 A2 | 12/1997 |
| EP | 0 849 734 | 6/1998 |
| EP | 0 853 315 | 7/1998 |
| EP | 0853315 A2 | 7/1998 |
| EP | 0 809 244 | 12/1998 |
| EP | 0809244 A3 | 12/1998 |
| EP | 0 849 734 | 3/1999 |
| EP | 0 853 315 | 12/1999 |
| EP | 0853315 A3 | 12/1999 |
| JP | 10063562 | 3/1998 |
| JP | 10063562 A2 | 3/1998 |
| JP | 11039262 | 2/1999 |
| JP | 11039262 A2 | 2/1999 |
| JP | 2000-059788 | 2/2000 |
| JP | 2003-523024 | 7/2003 |
| JP | 2004-096228 | 3/2004 |
| JP | 2005-525011 | 5/2005 |
| JP | 2005-223407 | 8/2005 |
| JP | 2005-286911 | 10/2005 |
| WO | WO 98/47080 | 10/1998 |
| WO | WO98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO00/08855 | 2/2000 |
| WO | WO 00/16229 | 3/2000 |
| WO | WO 00/18054 | 3/2000 |
| WO | WO 00/24192 | 4/2000 |
| WO | WO 01/59706 | 8/2001 |
| WO | WO 02089117 | 11/2002 |
| WO | WO02089117 | 11/2002 |
| WO | WO 03088248 | 10/2003 |
| WO | WO03088248 | 10/2003 |
| WO | WO 03/091850 | 11/2003 |

OTHER PUBLICATIONS

Examiner Interview Summary from 11258677 mailed Feb. 24, 2009 (86621).

"Advanced Television Enhancement Forum Specification (ATVEF)", Comment Draft Version 1.0rl, 1-20 copy printout from web site, http://www.atvef.com/atvef_spec/TVE-public.htm Oct. 18, 1998.

"All About DIVX, Where the Facts are Told and the Decision is Yours!", Webmaster's Note, http://www.prodivx.com Jan. 26, 1999.

"Content Reference Forum, "About the Content Reference Forum"", Retrieved on Apr. 20, 2004; from http://www.crforum.org/articles/about/overview.html.

"Content Reference Forum, "The Digital Content Industry's Current Problem"", Retrieved on Apr. 20, 2004; from http://www.crforum.org/index.html, 2 pages.

"Content Reference Forum, "Work Process" Retrieved on Apr. 20, 2004;", from http://.crforum.org/articles/about/techprocess.html, 4 pages.

"Content Reference Forum, BP10 003:", Baseline Profile Specification 1.0; Guide to Data Formats (Informative). Dec. 1, 2003, 12 pages.

"Content Reference Forum, BP10 004:", Baseline Profile Specification 1.0; Data Formats. Dec. 1, 2003, 14 pages.

"Content Reference Forum, BP10 010:", Baseline Profile Specification 1.0; Common Data Structures. Dec. 1, 2003, 9 pages.

"Content Reference Forum, BP10 011:", Baseline Profile Specification 1.0; Description Data Structures. Dec. 1, 2003, 13 pages.

"Content Reference Forum, BP10 012:", Baseline Profile Specification 1.0; Environment Data Structures. Dec. 1, 2003. 7 pages.

"Player 2.0 Product Description", Copyright 1995-200, InterActual Technologies 2000, pp. 1-3.

Chen, et al, "Video and Audio: Organization and Retrieval in the WWW", White Paper http//vosaic.com/corp/papers/www5.html, Http://citeseer.nj.nec.com/chen96video.html 1996, pp. 1-11.

"Voyager CDLink Turns Audio CDs into CD-ROMs", Press Relase, Voyager Co.; (Jul. 12, 1995) http://www.voyagerco.com; from Jul. 12, 1995-1997.

"Web/CD-ROM hybrids; A working definition", site established Oct. 2, 1998, http://www.philb.com/webcd.htm 1998, 5 pages.

Clark, Roger , "WebCD, Internet Posting", Dec. 1, 1996, http://www.anu.edu.au/people/Roger.Clarke/II/WebCD.html 1996, 3 pages.

Gustavson, Ron , "MarketScape's WebCD Pro Publisher", *Emedia Professional*, http://www.emedialive.com/awards/award11.html Dec. 1997.

Int'l Searching Authority, , International Search Report and Written Opinion of the International Searching Authority for PCTUS064059 mailed Jun. 19, 2008 (86621pct).

Mascha, Michael et al., "Interactive Education: Transitioning CD-ROMs to the Web", Dept of Anthropology, Univ Southern California, Los Angeles, California, USA; *Computer Networks and ISDN Systems 27* 1994 , 267-272.

Nakane, et al., "Development of combined HDD and recordable-DVD video recorder", Consumer Electronics, 2002, IEEE, *2002 Digest of Technical Papers*, International Conference on Jun. 18-20, 2002 , 264-265.

Polanskis, Rachel , "Re: WebCD, Internet Posting", Dec. 2, 1996, http://www.anu.edu.au/mailarchives/link/link9612/0013.html 1996.

Randall, U.S. Appl. No. 11/258,677, filed Oct. 25, 2005.

Collart, U.S. Appl. No. 09/489,596, filed Jan. 20, 2000.

Lamkin, U.S. Appl. No. 09/649,215, filed Aug. 28, 2000.

Reisman, Richard R. , ""CD-ROM/Online Hybrids, the Missing Link?"", *CD-ROM Professional*, vol. 8, No. 4 Apr. 1995, http://ww.teleshuttle.com/cdpart.htm Apr. 1995, 9 pgs.

Reismann, Richard R. , ""Spin Webs around a CD-ROM: The Next Generation of CD/Web Hybrids"", Teleshuttle Corporation, Mass High Tech; Sep. 2, 1996, http://www.teleshuttle.com/nextgen.htm Sep. 2, 1996, 3 pgs.

Roman, et al., "Program Visualization: The Art of Mapping Programs to Pictures", *ACM* 1992, 412-420.
Rosebush, et al., ""Hybrid 'Net: CD-ROMs & the Web working in tandem"", www.netscapeworld.com/netscapeworld/nw-08-1996/nw-08-hybridcd.html, published Aug. 15, 1996, 10 pgs.
Sastry, Chellury R. et al., ""Webtour: A System to Record and Playback Dynamic Multimedia Annotations on Web Document Content"", *Proceedings of the seventh ACM international conference on Multimedia*; Oct. 1999, 175-178.
First Office Action from the State Intellectual Property Office of the People's Republic of China for App. No. 2006800448492 dispatched May 18, 2010 (86621CN).
Getsin; U.S. Appl. No. 09/488,337, filed Jan. 20, 2000.
Getsin; U.S. Appl. No. 09/488,345, filed Jan. 20, 2000.
Collart; U.S. Appl. No. 09/489,596, filed Jan. 20, 2000.
Getsin; U.S. Appl. No. 09/489,597, filed Jan. 20, 2000.
Getsin; U.S. Appl. No. 09/488,614, filed Jan. 20, 2000.
Roman et al.; "Program Visualization: The Art of Mapping Programs to Pictures"; ACM 1992; pp. 412-420.
Myers et al.; "A Multi-View Intelligent Editor for Digital Video Libraries"; ACM 2001; pp. 106-115.
Texas Instruments; "Video Compression, Evaluating System Tradeoffs with H.264, VC1, and other Advanced Codecs"; http://cmpnetseminars.com/TSG/default.asp?q=248&K=HHOME; Jul. 21, 2005.
E Media Professional Reviews, NSM Galaxy Jukebox, by David Doering, Emedia Professional, Apr. 1999, (p. 78-80), http://www.emediapro.com/EM1999/doering4.html.
"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) pp. 267-272.
"Active Video Watching Using Annotation," by Nuno Correia and Teresa Chambel, ACM Digital Library, International Multimedia Conference, Oct. 30-Nov. 5, 1999, in Orlando, Florida.
"No Modem Needed: TV Signals Bring the Web to Your PC," by Michael S. Lasky, Computing Storypage, CNN IDG.net, May 19, 1998.
"All About DIVX, Where the Facts are Told and the Decision is Yours!" Webmaster's Note Jan. 26, 1999, http://www.prodivx.com.
Advanced Television Enhancement Forum Specification (ATVEF), Comment Draft Version 1.0r1, 1-20 printout from web site Http://www.atvef.com/atvef_spec/TVE-public.htm (Oct. 18, 1998).
MBone Multicasting Tomorrow's Internet, Request for Comments (RFC) 1112 and 1458, Appendices A and B, Copyright 1996, 1998.
Abstract of "MBone Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net/gaztec/gaztec15.htm, posted Sep. 7, 1998, vol. II, No. 13.
"When Signed, Sealed, Delivered, It's Yours," by Precision Marketing, p. 30(1), Jul. 21, 1997. http://www.spinware.net/portanet/portanet.html. Printed on Jan. 8, 2003.
Abstract of Edgar Weippl's, "An Approach to Role-Based Access Control for Digital Content," 2001, IEEE, pp. 290-294.
Henry M. Gladney, "Safeguarding Digital Library Contents and Users: Document Access Control," Dlib Magazine, http://www.dlib.org/dlib/june97/ibm/06gladdney.html, Jun. 1997.
"All power to the Web; CD-ROM is dead-or is it?" by Richard Reisman, President, Teleshuttle Corporation, Jan. 1996 Teleshuttle white paper on Distributed Media, http://www.teleshuttle.com/tsdistrib.htm.
"CyberMedia Secures Major Licensing Agreement With Sony for Oil Change Software," http://www.cypbermedia.com/company/pr/sony.html, Nov. 26, 2001.
MarketScape's WebCD Pro Publisher, Ron Gustavson, Ermedia Professional, Dec. 1997, http://www.emedialive.com/awards/award11.html.
"Hybrid CD-ROM/Online Titles Will Surge in 1996," DCD Business, Apr. 1996, http://www.tapediscbusiness.com/issues/1996/0496/apr_index.html.
PC Magazine, "Trends Online: Intel's Internet Plans: Hybrid Applications", Jul. 24, 1996.
"Internet tool triggers audio CDs," by Cate C. Corcoran, Jul. 24, 1995, http://www.access.ch/power/infoservices/MacWeek/MacWeek240795.html.
"MarketScape(R) WebCD(TM) 1.0 Bypasses Internet Bottlenecks," DialogWeb, Aug. 26, 1996.
Content Reference Forum, BPI0 009: Baseline Profile Specification 1.0; Reference Service Protocol. Dec. 1, 2003.
Content Reference Forum, BP 10 010: Baseline Profile Specifications 1.0; Common Data Structures. Dec. 1, 2003.
Content Reference Forum, BP 10 011: Baseline Profile Specifications 1.0; Description Data Structures. Dec. 1, 2003.
Content Reference Forum, BP 10 012: Baseline Profile Specifications 1.0 Environment Data Structures. Dec. 1, 2003.
Content Reference Forum, CELWG002 001: CEL; Contract Expression Language, Dec. 3, 2003.
Content Reference Forum, Work Process, Retrieved on Apr. 20, 2004; from http://www.crforum.org/articles/about/techprocess.html.
Content Reference Forum, Technical Work Policy, Apr. 25, 2003.
Content Reference Forum, Working Groups and Specifications, Retrieved on Apr. 20, 2004 from http://www.crforum.org/articles/aboutltechwork.html.
Content Reference Forum, Introduction, Mar. 17, 2003.
Content Reference Forum, Contract Expression Language (CEL)-An UN/CEFACT BCF Compliant Technology, Jan. 21, 2004.
"CD-ROM/Online Hybrids, The Missing Link?" by Richard R. Reisman, CD-ROM Professional, vol. 8, No. 4, Apr. 1995, http://www.teleshuttle.com/cdpart.htm.
Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuffhtml.
Cooper, Barry, "Oil Change software hunts down upgrades," The Orlando Sentinel, Web-Posted Oct. 30, 1996, The Augusta Chronicle Online, http://www.augustachronicle.com/headlines/103196/oil_change.html.
Player 2.0 Product Description, Copyright 1995-2000, InterActual Technologies.
Resource Guide on Distributed Media: Local/CD-ROM/Online/Web, updated Nov. 25, 1996, Richard R. Reisman, President, Teleshuttle, http://www.teleshuttle.com/resource.
"Topic is Veritably Everywhere: CD-ROM, the Web, Intranets, etc.," Seybold Report on Desktop Publishing, vol. 10, No. 7, Copyright 1996 by Seybold Publications Inc.
"Spin Webs around a CD-ROM: The Next Generation of CD/Web Hybrids," Richard R. Reisman, President, Teleshuttle Corporation, Mass High Tech, Sep. 2, 1996, http://www.teleshuttle.com/nextgen.htm.
"Update Your Software While You Sleep," Edited by Paul M. Eng, Bits & Bytes, BusinessWeek, Updated Jun. 17, 1996, http://www.businessweek.com/1996/25/b3480140.htm.
"Verity smooths Net searches," by CNET News.com Staff, Tech News—CNET.com, Feb. 20, 1996.
"Video and Audio: Organization and Retrieval in the WWW", White Paper. (1996) http://vosaic.com/corp/papers/www5.html. Http://citeseer.nj.nec.com/chen96video.html.
"Web/CD-ROM hybrids; A working definition," site established Oct. 2, 1998, http://www.philb.com/webcd.htm.
Who's Who Hybrid Internet/CR-ROM Magazine/Catalog, Google cache Nov. 26, 2001, http://www.ecatcorp.com/alpha/mci.htm.
WebCD, Internet Posting, Roger Clarke, Dec. 1, 1996, http://www.anu.edu.au/people/Roger.Clarke/II/WebCD.html.
Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.
Re: WebCD, Internet Posting, Liddy Nevile, Dec. 2, 1996, http://www.anu.edu.au/mail-archives/link/link9612/0010.html.
Re: WebCD, Internet Posting, Rachel Polanskis, Dec. 2, 1996, http://www.anu.edu.au/mail-archives/link/link9612/0013.html.
www.techdirt.com/articles/20030516/1358202.shtml, May 16, 2003.

www.techdirt.com/articles/990616/1020235_F.shtml, Jun. 16, 2003.

"MultiSync: A Synchronization Model for Multimedia Systems," IEEE Journal on Selected Areas in Communications, vol. 14, No. 1, Jan. 1996, pp. 238-248.

"World-Wide Web: a distributed paradigm for global hetworking"; Heylighen, F., Proceeding SHARE Europe Spring Conference; pp. 355-368; Apr. 18, 1994.

"A Simplified and an Efficient Packet Level Internet Access Control Scheme"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/~duguid/wirecdlk/html.

"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.

"Voyager CD Link Turns Audio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired.com/wired/archive/4.05/net_surfhtml.

"Voyager CD Link (VCD) Control Language Reference", available at http:web.archive.org/web/19970213172801/www.voyagerco.com/cdlink/aboutlvcd_ref/cmdref.html, originally available at http:www.voyagerco.com/cdlink/about/vcd_ref/cmdrefhtml on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.

"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; NewMedia, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLs", available at http://archive.ncsa.uiuc.edu/demoweb/url-primer.html., Mar. 17, 2004.

"Naming and Addressing: URIs, URLs, . . ."Printed Mar. 17, 2004. available at http://www.w3.org/ Addressing/.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, Consumer Electronics, 2002, IEEE, 2002 Digest of Technical Papers, International Conference on Jun. 18-20, 2002, pp. 264-265.

Re: WebCD, Internet Posting, Ron Ipsen, Dec. 1, 1996, http://www.anu.edu.au/mail-archives/link/link9612/0006.html.

Content Reference Forum, "The Digital Content Industry's Current Problem" Retrieved on Apr. 20, 2004; from http://www.crforum.org/index.html.

Content Reference Forum, "About the Content Reference Forum" Retrieved on Apr. 20, 2004; from http://www.crforum.org/articles/about.overview.html.

Content Reference Forum, CR10 001: Core Specification 1.0; Data Formats. Dec. 1, 2003.

Content Reference Forum, BP10 001: Baseline Profile Specification 1.0; Baseline Profile. Dec. 1, 2003.

Content Reference Forum, BP10 002: Baseline Profile Specification 1.0; Contract Expression Language Extension and Profile. Dec. 10, 2003.

Content Reference Forum, BP10 003: Baseline Profile Specification 1.0; Guide to Data Formats (Informative). Dec. 1, 2003.

Content Reference Forum, BP10 004: Baseline Profile Specification 1.0; Data Formats; Dec. 1, 2003.

Content Reference Forum, BP10 005: Baseline Profile Specification 1.0; Constants and Enumerations. Dec. 1, 2003.

Content Reference Forum, BP10 006: Baseline Profile Specification 1.0; Rights Expressions. Dec. 1, 2003.

Content Reference Forum, BP10 007: Baseline Profile Specification 1.0; Offers. Dec. 1, 2003.

Content Reference Forum, BP10 008: Baseline Profile Specification 1.0; Usage Licenses. Dec. 1, 2003.

International Searching Authority, International Search Report and Written Opinion of the International Searching Authority for PCT/US06/4059, mailed Jun. 19, 2008.

USPTO; Notice of Allowance issued in U.S. Appl. No. 11/428,187; Mailed Jan. 10, 2012; 8 Pages.

USPTO; Office Action issued in U.S. Appl. No. 11/849,898; Mailed May 8, 2012; 7 Pages.

Japanese Patent Office; Notice of Rejection issued in Japanese Patent Application No. 2008-537766; Mailed Oct. 21, 2011; 8 Pages.

* cited by examiner

METHODS AND SYSTEMS FOR USE IN MAINTAINING MEDIA DATA QUALITY UPON CONVERSION TO A DIFFERENT DATA FORMAT

PRIORITY CLAIM

This application is a continuation of application Ser. No. 11/258,677, filed Oct. 25, 2005, which is incorporated herein by reference in its entirety.

FIELD OF THE INVENTION

The present invention relates generally to data conversion, and more particularly to maintaining data quality upon conversion of media data to a different data format.

BACKGROUND

The use of digital content, such as multimedia data has exploded over the last several decades and continues to increase. There are numerous types of formats in which digital content is maintained. These formats vary widely and some are proprietary.

A system that can utilize digital content typically has to be able to utilize the content in the format in which the content is received. Some systems fail to access content when the content is not in a desired format. Other systems provide for an alternate conversion of the content into a more usable format.

SUMMARY OF THE EMBODIMENT

The present invention advantageously addresses the needs above as well as other needs through the provision of methods, apparatuses, and systems for use in maintaining data quality upon conversion to a different data format. In some embodiments, methods receive media data in a first format; initiate a first conversion of the media data at the first format to a second converted format; identify parameters dictating the conversion to the second converted format; record the parameters; and distribute the recorded parameters to remote systems such that the parameters at least in part control the remote systems during a conversion of the media data to the second converted format.

Some embodiments provide methods for use in converting media content. These methods receive a first formatted content stream configured according to a first format; initiate a first conversion of the first formatted content to a second format producing a second formatted content; record a first set of parameters that at least in part control the conversion from the first format to the second format; evaluate at least a first portion of the second formatted content; adjust a first parameter; record the adjustment of the first parameter; and supply the first set of parameters and the adjustment of the first parameter to a remote system.

The present embodiments further provide apparatuses for use in converting multimedia content. Some of these apparatuses include a converter system that receives content in a first format and converts the content to a second format; a memory storing a plurality of parameters that control the converter system during the conversion of the content to the second format; an analyzer system coupled with the converter system to receive the second formatted content, analyzes a quality of the second formatted content, and determines adjustments to a first set of parameters; and a distribution unit coupled with the converter that detects the adjustments to the first set of parameters and distributes at least the adjustments to the first set of parameters to remote client systems.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
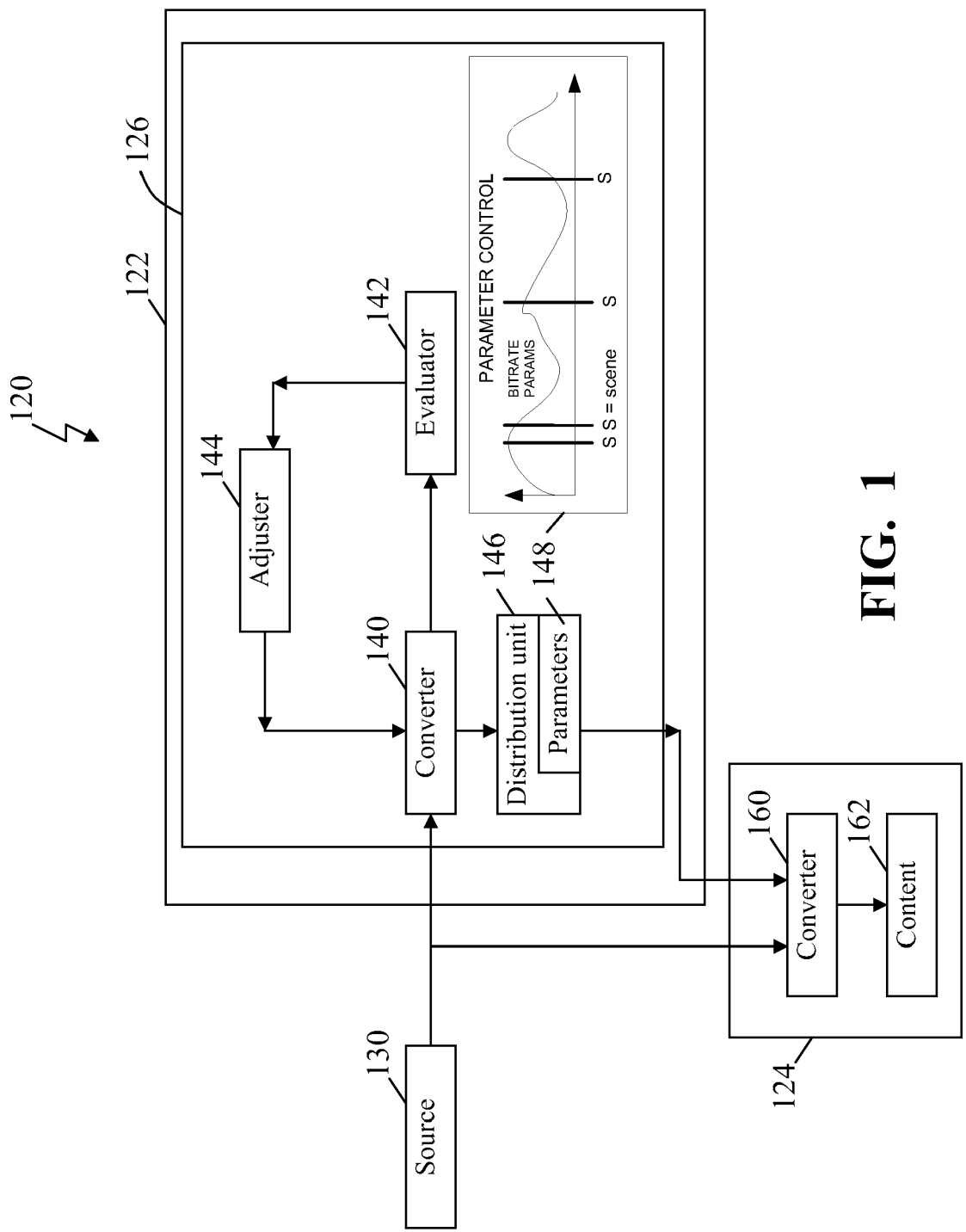
FIG. 1 depicts a simplified block diagram of a system according to some embodiments that improves and/or optimizes a conversion of content at a remote client device or system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for improving and optimizing the formatting of digital content, such as multimedia content, as well as improving the playback of formatted and/or encoded digital content. Many systems accessing or playing back content operate better and/or need content in a defined destination format. Optimizing the conversion or transcoding of content into the destination format can be computationally complex and time consuming. Further, some systems do not have the processing, evaluation and/or adjustment capabilities to optimize the conversion. The present embodiments, however, define key values, settings and/or parameters (referred to below as parameters for simplicity) that can be utilized by a client system or device to improve and/or optimize the conversion without and/or limiting the need for the client device to perform the evaluation and optimization.

In many instances, multimedia content is supplied in a first format as configured by a supplier. Often this first format is a relatively highly compressed format for recording and/or distributing over a network. To access or playback the content, many client systems convert the content from the first format to a destination or second format in order to accurately access or playback the content. For example, a content provider may take initial source content, such as an uncompressed video and/or audio content data, and format that into a first format, such as into a compressed Windows Media Video (WMV) format, fractal compression, RealVideo format, and other such formats. Many client systems, however, cannot utilize content received in this first format or more optimally utilize content in a secondary format. As such, these systems typically convert and/or transcode the content from the first format to a second format to allow access to and/or playback of the content. The conversion can include large amounts of processing, can be difficult, and can be time consuming to achieve desired results. Further, the conversion from the first format to the second format can introduce errors and/or degrade the quality of the content.

Typically, conversion and/or transcoding involves lossy conversion where the conversion process inherently loses data. These types of lossy conversions are employed because they typically provide much greater coding efficiency such that a bitrate can be reduced while still achieving substantially or exactly the same perceived quality, and typically this quality is achieved without the complicated overhead and processing requirements associated with lossless conversion. Therefore, the re-conversion or secondary conversion through a lossy conversion of content already converted to a first format through a first lossy conversion compounds the losses potentially further degrading the quality of the content in the secondary format.

The present embodiments improve and/or optimize the conversion of content to a destination format. In part, the present embodiments define additional parameters and/or identify optimal settings of parameters that can be applied at a client system while performing the destination conversion to reduce errors and/or better optimize quality. Further, in some implementations, the present embodiments improve conversion speeds, reduce complexity associated with the destination conversion, and other advantages, some being further explained below. Still further, because the present embodiments simplify conversions at the client system, the complexity of the client systems performing the secondary or destination conversions can often be simplified, and thus, often manufactured at reduced costs while still providing improved resulting conversion quality.

As introduced above, the present embodiments create one or more additional parameters and/or define settings of one or more parameters that are later used by a client system to convert content to a different or destination format. In some embodiment, the additional parameters and/or adjusted parameters are derived by taking content in a first format (e.g., a first or source format that is an original higher quality source) and converting, transcoding, encoding and/or performing other conversions to a secondary destination format and capturing key values, settings and/or parameters used during the process. Utilizing these captured parameters, the content in the first format (e.g., high quality source) can then be later converted (e.g., encoded) to an intermediate format, typically that is a higher compression format that is more readily stored and/or distributed (e.g., over a network such that a consumer client can download in a reasonable amount of time). The captured additional and/or adjusted parameters can either be supplied with the content in the intermediate format (e.g., downloaded by the client system at the same time with the content, even in the same file) can be received separate from the content or can come from a different source. Then when the client system is to convert or transcode the received content (e.g., media file) the additional parameters are applied by the client system to create a better quality converted content and/or increases the speed of conversion than could typically be obtained when converting without the additional and/or adjusted parameters.

In some embodiments, a conversion similar to and/or identical to the conversion to be performed by the client system is implemented by the content source provider and/or secondary party where the conversion at the source provide or secondary party is performed on a powerful system and time is taken by operators to obtain a high quality and/or optimized conversion that will result in a desired and/or optimized output. Steps are taken in determining and/or obtaining the additional and adjusted parameters, including altering settings, re-encoding some or all of the content to deal with transcoding issues discovered during quality control check and other such parameters, to optimize the conversion such that the settings and parameters used are captured by the source provider and/or secondary party. These parameters are then forwarded to client systems to allow a duplication of the optimized conversion on one or more clients without the need to perform the time consuming and processing overhead evaluation at the client systems. Some or all of the parameter listing can be packaged with the content supplied to the client systems and/or can be transmitted separately.

FIG. 1 depicts a simplified block diagram of a system 120 according to some embodiments that improves and/or optimizes a conversion of content at a remote client device or system 124. The system includes a source or head end 122 and the client system 124. The head end 122 includes a conversion optimization system 126. Source content 130 is received and/or generated at the head end 122 in a first or initial format, such as an uncompressed video and audio (e.g., as received from recording devices) or at a first converted format (e.g., WMV). The conversion optimization system 126 receives the source content 130 and initiates a conversion and/or transcoding of the source content into a destination format. The client system 124 also receives the source content 130.

The conversion optimization system 126 includes a converter 140, an evaluation or analyzer system 142, an adjustor system 144, and a distribution unit 146. The conversion optimization system 126 receives the content and initiates a conversion of the content to a desired destination format that is substantially the same as the destination format to be produced by the client system 124. During and/or after the conversion, the optimization system 126 evaluates the converted content through the analyzer 142 to determine whether adjustments can be made during the conversion process 140 to enhance and/or improve the quality of the converted content. In some embodiments, the optimization system 126 employs multiple quality check cycles to achieve enhanced and/or optimal conversion quality. The adjustments are applied to the converter 140 through the adjustor 144. The parameters can be adjusted and vary over the course of the conversion. For example, the parameters can be altered during a particular segment or sub-segment of complex or difficult-to-encode content to avoid quality degradation. Typically, the settings or parameters used by the converter 140 and/or adjusted parameters 148 are recorded by the distribution unit 146 while the final converted content is typically discarded at the head end. The parameters can include any number of parameters used in controlling the conversion and/or optimizing the conversion, such as changes in bit rate allocation, scene detection, and other parameters.

The converter 140 can perform one or more conversions, such as transcoding, decompression, decoding, encoding, and other such conversions or combinations of conversions. For example, in some implementations, the converter 140 can receive the first formatted content, decode the content returning the content to the source format, and then the converter can encode the content to the second format. In some implementations, the converted content produced with the recorded parameters is additionally recorded for future evaluation and/or debugging of quality issues that may later arise and/or be experienced by the client systems. For example, the recorded converted content can be directly compared visually or through a system with client output content. Differences imply a breakdown or failure within the communication of the parameter data, the client system or some other aspect of the system due, for example, to codec mismatches, download corruption or logical failures. The converted content may also be maintained by the source provider when one or more high bandwidth connections are available to allow direct downloading of the converted content, which would avoid a client system needing to transcode. Similarly, the converted content can be utilized, for example, in the mass production of digital versatile discs (DVD) in the secondary format for distribution to retailers, while the parameter data recorded can be utilized as described above and further below for use by client systems that receive the content in the first format (e.g., received as a download over the network).

The converter 140 can include encoding and/or transcoding hardware and/or software. Some implementations further include additional processing, filtering and other conversion hardware and/or software. In some embodiments, the converter substantially mimics and/or produces conversion that would be results substantially equivalent to the converter 160 of the client system 124 when parameters are applied by the client system. The analyzer system 142 can be implemented through software and/or a human evaluator that determines whether adjustments are to be made to parameters and settings of the conversion system 140. In many implementations, the evaluation system uses multiple quality check cycles, to achieve a desired or optimal conversion quality. The settings often vary over the length of the content. Final conversion results may be approved by a trained analyst and/or by an automated quality measuring system. Typically, the conversion results are discarded, but the parameters and/or settings 148 of the conversion system are recorded, including time-domain information and distributed to the client system (s).

The client system 124 includes a converter 160 that can be implemented through hardware, software, firmware and/or combinations thereof. The source content 130 is distributed to the remote client 124. The distribution to the client 124 can include recording the source content 130 to a portable medium and distributing the medium to the remote client, the content can be communicated over a distributed network, such as streamed over the Internet, wirelessly broadcasts, or other such distribution methods and/or combinations of distribution methods. In some implementations, the source content is provided in a first format, such as a compressed and/or encoded format, that allows for easier transmission and/or reduces a storage size when recording the content. The client converter 160 can perform one or more conversions, such as transcoding, decompression, decoding, encoding, and other such conversions or combinations of conversions.

Further, the client system 124 also receives the recorded parameter and/or adjusted parameter data recorded by source provider head end 122. The recorded parameters can be communicated separate from the content, or some or all of the parameters can be cooperated with the content 130 and distributed to the remote clients 124 with the source content. Upon receipt of the content and the parameters, the remote client 124 applies the received parameters to control the converter 160 when converting the content 130 to a destination format 162. By utilizing the received parameters, the remote system 124 can achieve a higher quality conversion than is typically achievable through the client system alone, and in some instances at increased conversion speeds. Further, the remote client system 124 can be a simplified system because many of the conversion processing and/or decision making steps implemented to achieve improved quality are performed at the optimization system 126, thus freeing up resources and/or eliminating the need for some resources at the remote client system 124, as is fully described below.

The use of the conversion parameters 148 can improve and/or establish a quality in a variety of situation, for example, where distribution codecs are different from playback codecs. This also applies to substantially any codecs such as WMV, Real Video, MPEG formats, Blu-ray format, advanced video coding (AVC) for high-definition digital versatile discs (HD-DVD), DVDs, or recorded by digital video recorders (DVR), H.264 for cell phones and portable media players, and other such codecs. The use of optimized parameters supplied to client systems can be apply to substantially any type of content to be converted and/or transcoded including audio transcoding and other media conversion and transformation processes.

Figure 2:
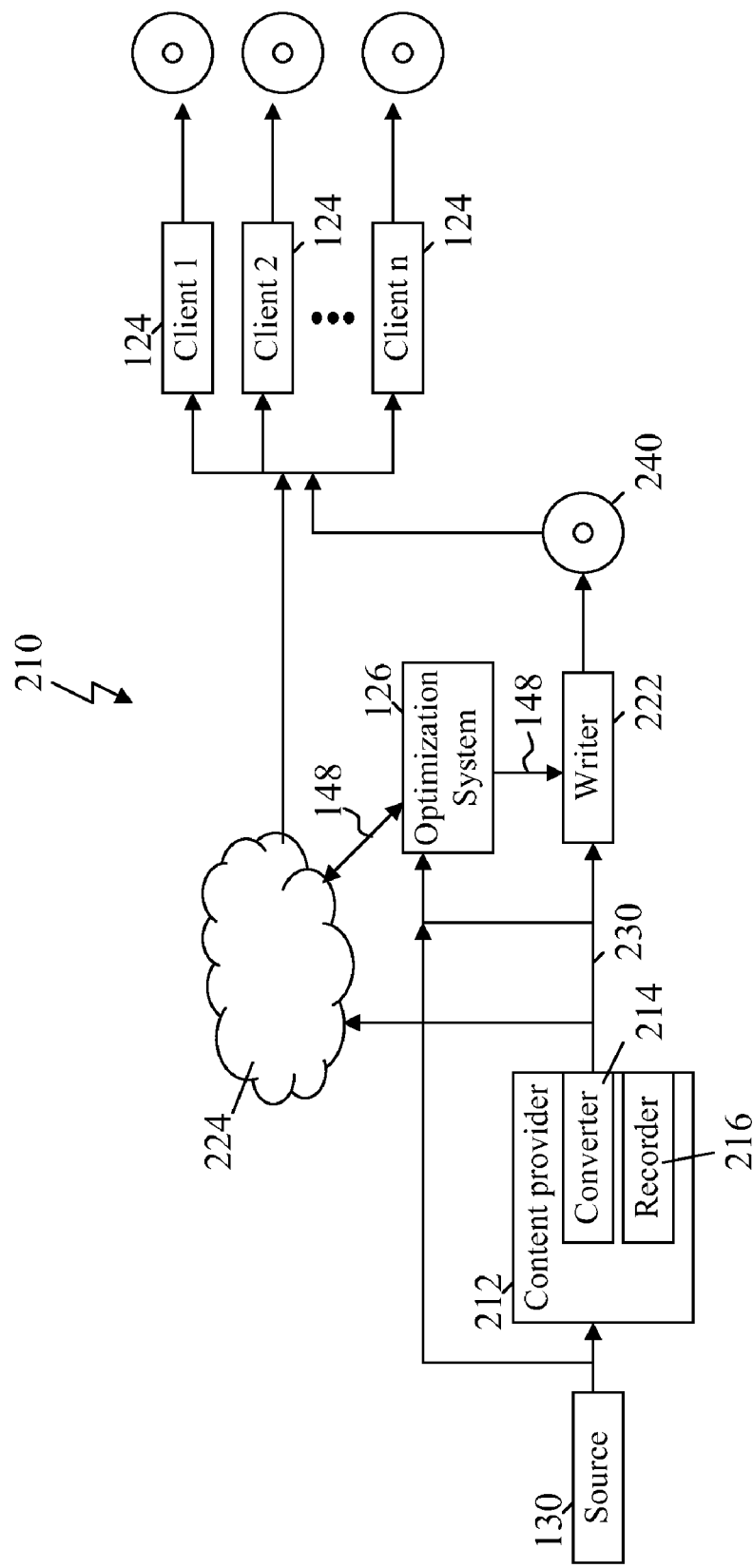
FIG. 2 depicts a simplified block diagram of a content distribution system according to some embodiments that employs the system of FIG. 1.

FIG. 2 depicts a simplified block diagram of a content distribution system 210 according to some embodiments that employs the system 120 of FIG. 1. The distribution system 210 includes a source of content 130, a source content provider 212, one or more remote client systems 124, a conversion optimization system 126, a digital content writing system 222, and/or a distributed network 224.

Source content 130 is initially obtained at the source provider 212 in an initial format, such as uncompressed video and audio data. The source provider 212 can include a converter 214 that converts or formats the initial content into a first converted format 230. This first converted format can be employed, for example, to reduce an amount of bandwidth needed to communicate the content and/or reduce the amount of memory needed to store the content. The first format can, in some instances, further provide structure to the content, can add additional content, and/or can configure the content to be more readily distributed whether by recording the content to a portable medium or transmitting the content over a network. For example, the converter 214 of the source provider 212 can converter the uncompressed video and/or audio content to the WMV encoded format.

In some embodiments, parameters defining how the first conversion is implemented are monitored and/or recorded by a parameter recorder 216 during the first conversion and these parameters are supplied to the optimization system 126 for use by the optimization system in performing a subsequent conversion to a secondary or destination format. Additionally and/or alternatively, a log can be generated by the source provider 212 including parameter data and/or other processing information (e.g., filtering applied, changes made to the content and other such processing information) used by the source provided in configuring and/or formatting the content. This log file can be supplied to the optimization system 126 and used to define settings of parameters at the optimization system. For example, when a first filtering is applied to the content by the source provider 212, the parameter data and/or log from the source provider can notify the optimization system 126 so that the optimization system does not attempt to again apply the same filter in instances where applying the same filtering more than once can actually degrade the quality of the resulting converted content. Similarly, in some instances the parameters or log file can record that editing, filtering or other processing was performed to the content and the log file can be used to notify the optimization system of the previous editing and/or processing. For example, if an image has been edited to apply redeye reduction, the log file can record that redeye reduction has been apply so that the optimization system does not attempt to further apply redeye reduction when doing so would degrade the quality of the image. Additionally, motion estimation data, scene data, film frame position data, and other such data gathered during a conversion can be reused by the optimization system in subsequent conversions to speed up the generation of optimization parameters obtained and/or altered during the subsequent conversions.

The source content 130 and/or formatted content 230 is forwarded to the conversion optimization system 126. In some embodiments, the conversion optimization system 126 is part of the source provider 212 at a head end of the content supply chain. The source provider 212, in some embodiments, further processes or prepares the first formatted content for distribution, such as encrypting or further encrypting the content, filtering the content, defining additional parameters for use by the conversion optimization system and/or other such preparation.

The source content 130 and/or first formatted content 230 is delivered to the conversion optimization system 126 where the optimization system attempts to optimize the conversion of the content to one or more secondary formats by adjusting parameters through one or more cycles of conversion and/or processing (e.g., decoding, encoding, segment encoding, re-encoding, filtering, and/or other such conversions). The optimization system 126 stores the parameters 148 utilized to achieve a desired or optimized secondary conversion(s). The parameter data, in some instances is recorded as metadata that can be utilized by the client systems 124 to implement the parameters during the conversion and/or transcoding of the content. For example, some of the parameter data can include a sequence of instructions that the encoders and/or decoders of client systems are to implement upon conversion.

The formatted content 230 is distributed to the remote client device 124. The distribution to the client device 124 can include recording the formatted content to a portable medium 240 and distributing the medium to the remote client, the content can be communicated over the distributed network 224, such as streamed over the Internet, or other such distribution methods and/or combinations of distribution methods. For example, the first formatted content 230 can be forwarded, in some implementations, to the writing system 222 where the writing system records the first formatted content onto one or more portable digital medium 240, such as a digital video disc (DVD), compact disc (CD) and/or other such portable media.

Some or all of the parameter data 148 utilized by the optimization system 126, in some instances, is also forwarded to the writing system 222 such that the writing system incorporates the parameter data with the first formatted content to be written to the medium 240. The medium with or without the parameter data can then be distributed to one or more of the client systems 124.

In some embodiments, some or all of the parameter data 148 generated at the optimization system 126 can additionally and/or alternatively be distributed to one or more clients 124 over the network 224. Utilizing the network 224 allows some or all of the first formatted content and/or some or all of the parameter data to be distributed without the need of the portable medium 240. Further, the network allows the first formatted content to be distributed utilizing the medium 240, while distributing the parameter data to select clients, such as clients that pay for upgrades and/or obtain authorization to perform the secondary conversion.

Upon receipt at the one or more client systems 124 of the first formatted content and some or all of the parameter data, the clients are capable of implementing an enhanced and/or optimized secondary conversion as dictated by the received parameter data. The client system uses the supplied parameter data to provide improved secondary formatted content, implement the secondary conversion at reduced processing times, and in some instances, can be achieved with simplified or less complex conversion systems than otherwise would be needed to achieve the similar secondary conversion results.

As an example, the source provider 212 can be a multimedia content provider, such as a movie studio, that supplies the multimedia content in the first format to a client 124, such as a DVD production company. The client converts the content from the first format to a second format for mass recording onto DVDs for distribution to retail outlets and consumers. Therefore, the client performs the second conversion to be compatible with consumer DVD playback systems (e.g., formatted into MPEG2 format).

Figure 3:
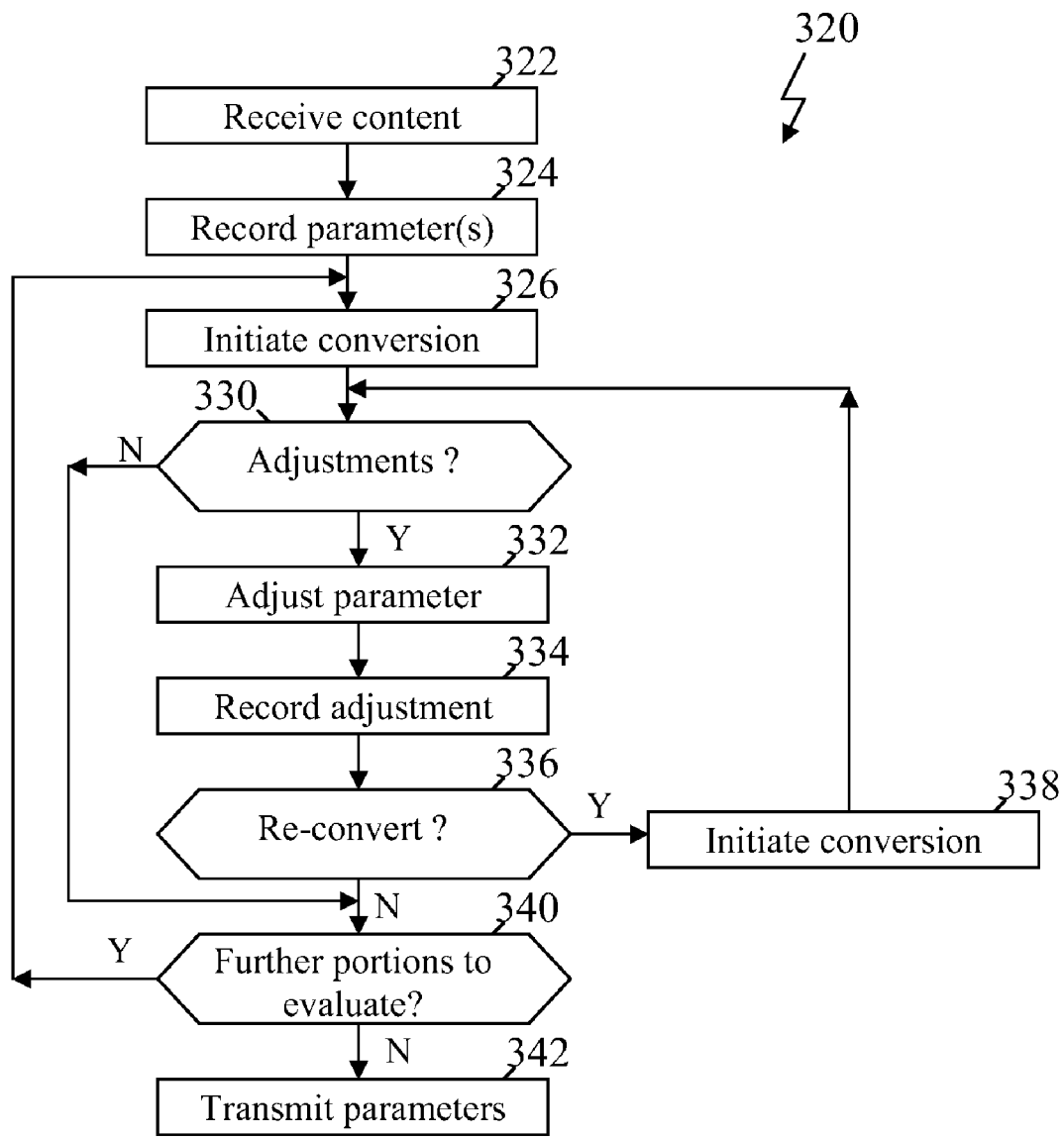
FIG. 3 depicts a simplified flow diagram of a process for use in generating optimization parameter data at an optimization system of FIG. 1.

FIG. 3 depicts a simplified flow diagram of a process 320 for use in generating optimization parameter data. In step 322, the content is received. The content can be the source content or can be an intermediate formatted content (e.g., WMV formatted content). In step 324, initial conversion parameters are recorded. These parameters can be default parameter settings, parameter settings specified by a source provider, parameters based on the source or an intermediate format, and/or other parameter settings. In step 326, a secondary conversion of the content is initiated (e.g., a conversion from source to MPEG2, from WMV to MPEG2, or other conversion). In step 330, the quality of a first portion of the converted content is evaluated and determined whether adjustments to one or more parameters can improve the conversion. When adjustments are not needed the process continues to step 340.

The evaluation of the quality of the converted content can include any number of evaluations and/or comparisons. For example, a subjective quality can be evaluated by an operator visually comparing the converted content with the initial content or previous converted content looking for areas of improvement and/or degradation. The degradation can include, for example, noise in the form of common compression artifacts such as "macroblocking", "mosquito noise", "halo-ing", and/or other such noise. Automated quality measures can also be used to trigger human review or automatic adjustments. The quality measures can include measures such as peak signal-to-noise ratio (PSNR) calculations, Sarnoff just noticeable difference (JND) calculations, and other such relevant measures. Additional evaluations, such as bit allocation and/or adjustments to bit rate can be determined and applied.

When adjustments are to be applied, the process enters step 332 where one or more parameters are adjusted. These parameters can include, but are not limited to, target bit rate over a particular time range, spatial pre-processing, temporal pre-processing, motion estimations, filtering, prediction modes, telecine detection, scene detection, and other such parameters as are more fully described below. In step 334, the adjustments to the parameters are recorded. In some instances, the adjusted parameters replace the previously recorded parameters. In other embodiments, the adjustments are recorded, for example, in an adjustment log such that the optimal parameters can be later identified by utilizing the log.

In step 336, the process determines whether the portion of converted content is to be re-converted while applying the adjusted one or more parameters. When a re-conversion is to be performed, the process enters to step 338 where a re-conversion of the portion of first formatted content is performed while applying the adjusted parameters, and the process then returns to step 330 for evaluation. The re-conversion, in some embodiments is implemented through a segment re-encode as described below. When re-conversion according to step 336 is not to be performed the process continues to step 340.

In step 340, the process 320 determines whether further portions of the first formatted content are to be converted and/or evaluated. When further portions are to be converted, the process returns to step 326. Alternatively, when further portions are not to be converted, the process records and/or distributed the parameters and/or adjusted parameters utilized to obtain a desired secondary conversion.

Many different factors are typically considered when evaluating whether adjustments to parameters are to be made to obtain a desired and/or optimized secondary conversion of the content. These factors also differ depending on the type of content being converted (e.g., video, audio, images, and other such content) as well as the first format of the content received from the source provider and the second format into which the content is to be converted. For example, when converting video data, the color, the clarity, shadowing, distortion, overall picture quality and/or other such factors of the displayed video data as played back from the secondary format are often considered. Additional considerations for optimizing the secondary conversion, for at least video, can include groups of picture (GOP) configurations, dependency of frames, numbers of frames between intra-picture frames (I-frames), noise, artifacts, PSNR calculations, JND calculations, and/or other such factors. The evaluation of these factors can be performed by machines and/or by human observation.

Because the optimization of the parameters is performed at the optimization system 126, the speed at which the optimization occurs typically is not critical, and instead can often take a prolonged amount of time in order to perform multiple desired evaluations and obtain desired parameters, where this prolonged time typically does not adversely affecting the client systems secondary conversion at the clients 124. Alternatively, by spending the time initially at the optimization system to achieve the desired parameters, the time needed at the clients 124 in performing the secondary conversion is typically reduced, and in some instances greatly reduced, while typically improving the resulting secondary conversion and often greatly improving the secondary conversion. For some client systems 124, the optimization of the secondary conversion achieved by these client systems when applying the parameter data could not normally be achieved because these client systems may not have the capabilities to perform the evaluations to determine which adjustments to parameters would be beneficial to improve the secondary conversion and/or have the time to determine adjustments. By utilizing the supplied adjusted parameters, however, these systems do not need to perform the evaluations and instead simply apply the supplied parameters to achieve an improved and/or optimized secondary conversion. Further, the forwarding of parameters provides a more deterministic or definitive resulting product achieved through the client systems. For example, the optimization system can define modes of operation (mode of dividing a macroblock for motion estimation) that the client system is to employ during some or all of the content to achieve a more deterministic conversion, and reduce the dependency on the client system.

In some instances, different parameters can be supplied and/or different values for parameters can be supplied depending on the client system, the level of conversion a client device is authorized for, and/or other factors. For example, two client conversion systems may exist, a basic conversion system and an enhanced conversion system, where the enhanced conversion system can apply a larger number of parameters and/or use a greater variation in parameter values. As such, the optimization system 126 can be employed to perform two conversions, a first conversion based on the basic conversion system to provide a first set of parameters for the base conversion system, and a second conversion based on the enhanced conversion system to provide additional and/or a second set of parameters for the enhanced conversion system. Similarly, different conversion systems may employ different conversion techniques and/or components within the systems. For example, a first conversion system may employ a first type of encoder, while a second conversion system may employ a second type of encoder that operates differently than the first encoder and/or has different parameter settings. Further, similar client systems may have differing authorization, for example, a first client system may have paid additional fees to receive additional parameter data for further enhancing the conversion, and as such different parameter data can be sent to the first and second client systems. Therefore, the optimization system 126 or a different optimization system 126 can perform optimization evaluations based on each expected conversion system and provide different parameters to each to improved conversion for each conversion system.

In many embodiments, the optimization system utilizes components that are substantially the same as or identical to the components of an intended client conversion system to identify the settings for parameters specific to that intended client conversion system. Therefore, many secondary conversions of the first formatted content may be performed depending on the anticipated client systems to be used in performing a secondary conversion. As introduced above, time needed by the optimization system 126 to define the final parameter data typically is not critical. Instead, the optimization systems often attempt to achieve one or more optimal sets of parameter data that optimize the secondary conversion of the content regardless of time constraints.

Figure 4:
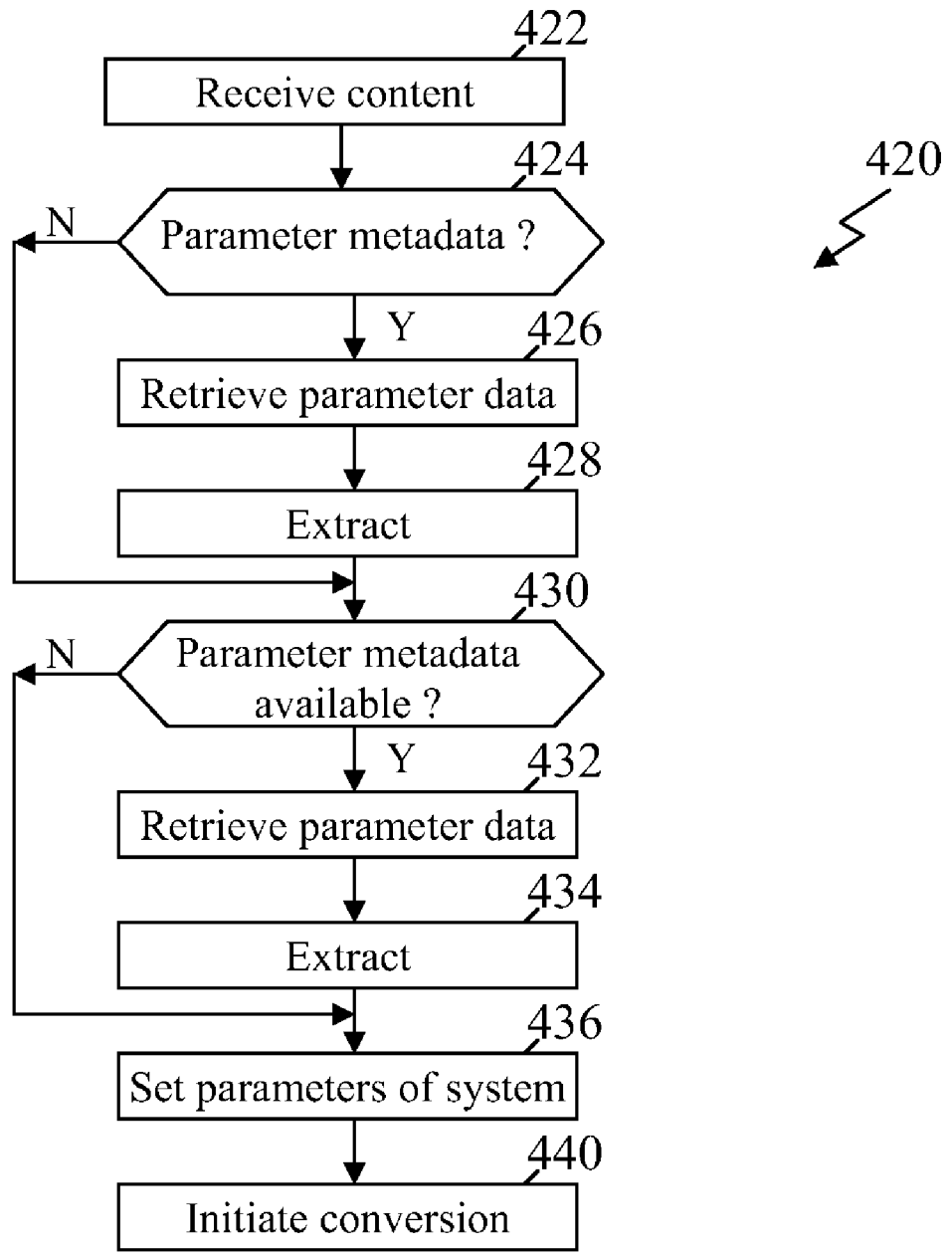
FIG. 4 depicts a simplified flow diagram of a process for use in performing a secondary conversion at a client system while applying adjusted parameters when available.

FIG. 4 depicts a simplified flow diagram of a process 420 for use in performing a secondary conversion at a client system while applying adjusted parameters when available. In step 422, the first formatted content is received. As described above, the first formatted content can be communicated from a source (e.g., received over a network 224), retrieved from a storage medium 240, a portion of the first formatted content can be received over a network while a portion is retrieved from a storage media, and/or from other sources or combinations of sources.

In step 424, the process determines whether parameter data is incorporated with and/or is supplied with the first formatted content, for example as metadata. When parameter data is not available with the first formatted content the process continues to step 430. Alternatively, when parameter data is available, step 426 is entered where some or all of the parameter data is retrieved. In optional step 428, the parameter data is extracted, uncompressed, decrypted and/or otherwise made available for use when the parameter data is compressed, protected and/or otherwise configured.

In step 430, the process determines whether parameter data and/or additional parameter data is available over the network 224 or from another source (e.g., previously obtained and locally stored, from a host system, and/or other such sources). When parameter data and/or additional parameter data is not available the process skips to step 436. Alternatively, when parameter data and/or additional parameter data is available step 432 is entered where some or all of the parameter data is retrieved from the source. In optional step 434, the parameter data is extracted, uncompressed, decrypted and/or otherwise made available for use when the parameter data is compressed, protected and/or otherwise configured.

In step 436, the client conversion system 124 is configured according to the obtained parameter data. In step 440, the secondary conversion of the first formatted content is initiated. The conversion continues applying the parameter data as it varies over the length of the content. The process 420 optionally returns to steps 424 and/or 430 to determine whether additional parameter data is to be retrieved during the course of the secondary conversions to continue to apply adjustments to parameters over the course of the conversion. The conversion achieved through the process 420, in some embodiments, results in a conversion that is substantially equal with the conversion achieved at the optimization system, which typically includes greater processing capabilities and where the conversion process typically takes much longer due to the process of identifying the parameters to adjust to achieve a desired and/or optimized conversion.

Figure 5:
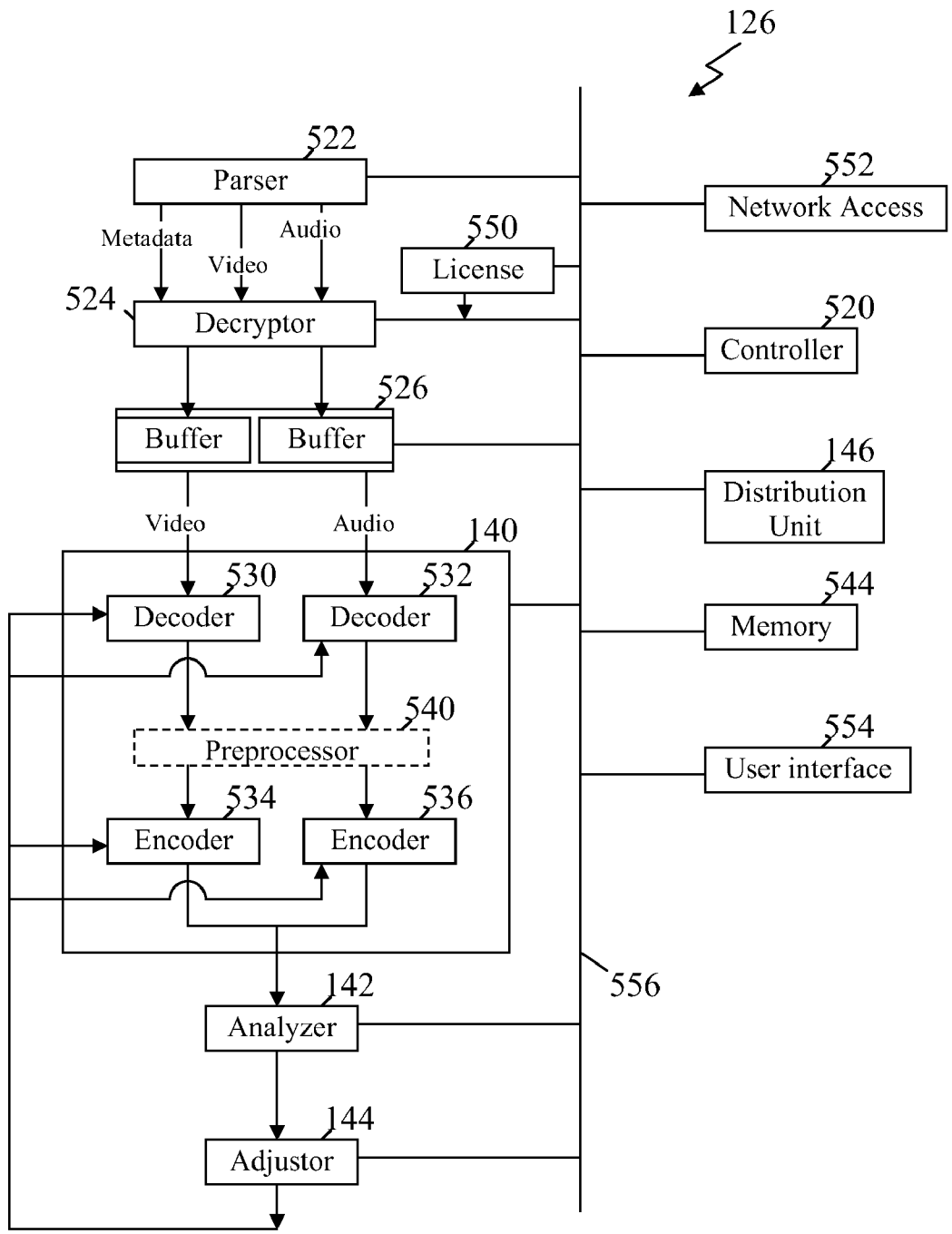
FIG. 5 depicts a simplified block diagram of a conversion optimization system according to some embodiments.

FIG. 5 depicts a simplified block diagram of a conversion optimization system 126 according to some embodiments. The optimization system 126 includes a controller 520, a parser 522, a decryptor 524, one or more buffers 526, a converter 140 that can be a transcoder and/or can include one or more decoders 530, 532 and one or more encoders 534, 536, an analyzer 142, an adjuster 144, a distribution unit 146, memory 544, network access 552, and user interface 554. The components of the optimization system can be coupled directly to other components and/or coupled through a bus 556. The controller 520 provides system control and can be implemented through a processor, microprocessor, computer, logic and/or other such controllers and/or combinations of controllers. It is noted that the parser 522, the decryptor 524, and/or the one or more buffers 526 may not be needed, for example, in some embodiments where the optimization system 126 is incorporated into the source provider 212 at the head end.

In operation, first formatted content 132 (e.g., WMV formatted content) is received, and the parser 522 separates out streams when the content includes multiple streams of data. For example, the content may include video content, audio content, parameter data (e.g., in the form of metadata), and/or other such streams. The parser separates out the streams when appropriate and supplies the first formatted content streams to an optional decryptor 524. The decryptor is utilized when the content streams are encrypted or otherwise protected. In those instances where content is encrypted, the decryptor receives a license and/or key 550 that is used to decrypted or otherwise access the protected content. In some instances the optimization system 126 further includes a network access 552 (e.g., a modem or other network access) that allows the optimization system to access a network 224 to obtain the first formatted content 132, parameter data, and/or the license/key 550.

Upon decryption of at least a portion of the one or more content streams, the streams are typically buffered in one or more buffers 526 to await decoding. The size of the buffer(s) can vary and depends on the expected size of the formatted content to be received and/or the speed of decoding. The one or more decoders 530, 532 pull content from the buffer(s) and decode the content to an initial or base format. For example, the first formatted content in a WMV format may be decoded back to the uncompressed source format.

The encoders 534, 536 receive the decoded content and convert the content to the destination or secondary format. For example, when the first formatted content 132 is received formatted in WMV and contains both audio and video data, the audio and video streams are separated and a video decoder 530 decodes the video content and an audio decoder 532 decodes the audio content. A video encoder 534 received the video content in the base format and encodes the video content into a secondary format, such as into MEPG2, H.626, fractal compression, and/or other such formats. Similarly, an audio encoder 536 receives the audio content in the base format and encodes the audio content to a secondary format, such as MPEG2 audio, MP3, Dolby Digital audio format, and/or other such formats. Other conversions can also be optimized, for example, the conversion of images from a first format to a Joint Photographic Experts Group (JPEG) format (e.g., compression ratio parameters used in compression), and other such conversions. In some embodiments, the system further includes one or more optional preprocessing units 540 for implementing modifications and/or performing processing of the content prior to encoding, such as noise reduction, pre-filtering, and other such preprocessing.

The analyzer system 142 evaluates the secondary formatted content to determine a quality of the secondary conversion. For example, the analyzer can evaluate the quality of the video data, determine whether adjustments to the operation of the decoder and/or encoder are to be applied. The analyzer 142 can determine what encoder bit rates are to be implemented for portions of the content stream, whether addition I-frames are to be included in the secondary encoded stream, whether GOP structures are to be redefined, whether filtering is to be applied and/or adjusted, whether a type of motion estimation is to be applied or changed, whether to implement a segment re-encode, and/or other such determinations. In some embodiments, the analyzer includes a decoder that at least partially decodes the secondary formatted content. Further the analyzer can include image quality analyzer that evaluates the quality of each frame and/or the inter-relationship between frames. For example, in some embodiments the analyzer can include an automated system that calculates PSNR and/or JND values and determines adjustments and applies the adjustments to picture type placement and bit allocation based on results from PSNR calculations, JND calculations and/or other qualitative measures.

The analyzer in some embodiments includes and/or is implemented through one or more technicians, operators or other individuals where the secondary formatted content can additionally and/or alternatively be supplied to the user interface 554 to allow the technician to additionally and/or alternatively evaluate the quality of the secondary formatted content. For example, when the secondary formatted content is video content the video content after being again decoded for playback at the user interface can be displayed to the user through the user interface 554 (which can include a display) to allow the operator to evaluate the quality. The technician(s) evaluating the secondary formatted content can define adjustments to parameters through the user interface 554 (e.g., through a keyboard and/or pointing device such as a mouse of the user interface) for the one or more encoders 534, 536.

The analyzer can further include a graphical user interface (GUI) to allow an operator or technician to evaluate the quality of the resulting converted content. The GUI can show, for example, statistical information about the conversion and/or transcode including, but not limited to, picture type placement, picture sizes in bits and overall bitrates. A split screen view can also be displayed through the GUI of before and after conversion so that the operator can compare and evaluate. The split screen images could additionally and/or alternatively overlay information such as motion vectors, bit allocation per macroblock and/or other such overlays so that the operator can make informed choices on encoding strategies. The analyzer can include additional features and perform further evaluations as described above and further below, as well as other evaluations as are known in the art.

The adjuster system 144 receives the adjustment instructions, determines the appropriate adjustments to be made and initiates the adjustments, for example applying adjustments of bit rates in the encoders 534, 536. In some embodiments, the adjuster system forwards adjustments to the controller 520 or is implemented as part of the controller, and the controller directs the encoders or other components to implement the adjustments. The adjustments or parameters associated with adjustments are further supplied to the distribution unit 146 to be recorded. As introduced above, the optimization system may additionally receive parameter data associated with the pre-processing and/or conversion to the first format from the source provider. These parameters can also be utilized to determine optimal parameters for the secondary conversion and/or applied while performing the secondary conversion.

The distribution unit 146 tracks, receives and/or detects the parameters and adjustments to the parameters as applied by the adjuster system 144, and stores, records and/or forwards the parameters and adjusted parameters to the network access 552 to be distributed over a network to a recording system and/or remote client systems. In some implementations, the distribution unit does not record parameter and/or adjusted parameter data until the analyzer system 142 accepts the secondary conversion. For example, once the analyzer causes a transition to a subsequent portion of content, the parameters and adjustments for the current portion of content are recorded (e.g., in memory 544, which can be local RAM, ROM, FLASH memory, portable storage medium, and other such memory or combinations of memory).

The implementation of the optimization system 126 can be through hardware, software, firmware and/or combinations thereof. In many embodiments, the optimization system attempts to duplicate and/or mimic the operations of client conversion systems 124 and/or components of those systems so that the adjusted parameters are optimized for those client systems and/or those components. In some embodiments, the optimization system employs components (e.g., decoder, encoders and/or other components) that are substantially the same as components of one or more client systems so that the resulting parameter data is applicable to at least the one or more client systems.

The parameters that the analyzer and/or operator can define and/or adjust can be substantially any parameter that alters the quality, speed and/or other factors in converting the content. For example, the parameters that can be adjusted can include, but are not limited to, define encoding bit rates for defined lengths of the content (e.g., with movie content, define encoding for a period of time of the content); define insertion points for new GOP structures; change parameters in a defined GOP sequence; telecine detection; scene detection; apply defined amount of spatial pre-processing, temporal pre-processing and/or other pre-processing for a time range; define a type of motion estimation to be utilized for a defined length of the content (e.g., different modes of dividing a macroblock for motion estimation, such as a single 16×16 macroblock, two 8×16 blocks, two 16×8 blocks, four 8×8 blocks, eight 4×8 blocks, eight 8×4 blocks, sixteen 4×4 blocks, or other modes); define filtering to be applied; defining picture types (e.g., progressive, interlaced); frame alignment; what quantization matrix should be applied at a give point; what type of entropy encoding mode should be used; mechanisms to manually guide motion estimation to gain better coding efficiency; coding scheme controls that guide in loop deblocking filter parameters; what transforms scans should be performed (e.g., alternative scans, zig-zag scans to improve entropy encoding); compression control; pre-filter (e.g., spatial filtering, noise reduction, temporal filtering); mode selection (e.g., macroblock); noise reduction; color balancing; light balancing and other such parameters.

Figure 6:
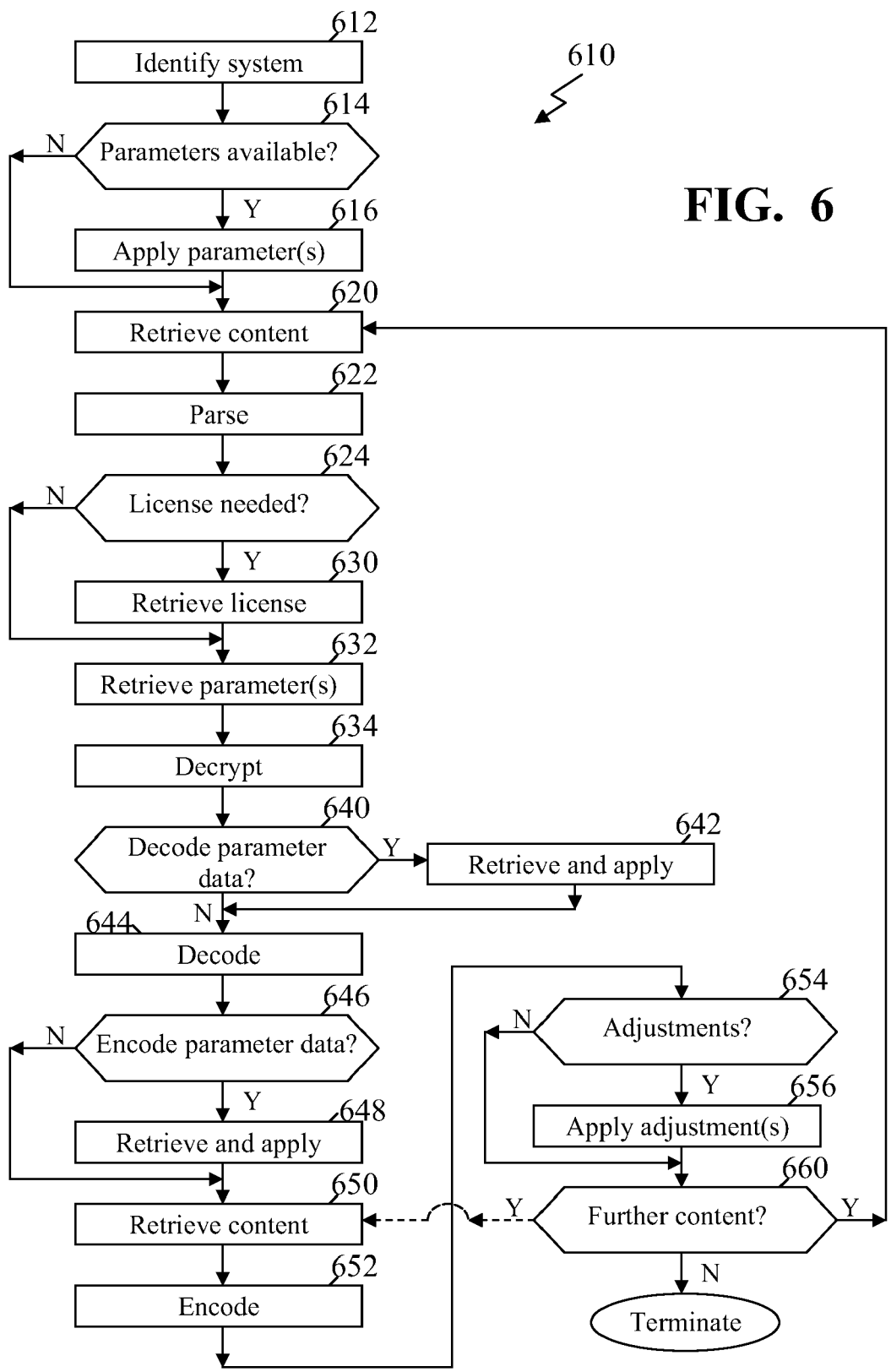
FIG. 6 depicts a simplified flow diagram of a process for use in generating and/or obtaining secondary conversion parameters.

FIG. 6 depicts a simplified flow diagram of a process 610 for use in obtaining secondary conversion parameters. In step 612, a secondary conversion system to be used is identified and one or more potential adjustable or variable parameters are determined. Typically, the conversion system is similar to and/or includes at least some components that operate similarly to one or more expected client conversion systems 124. For example, an encoder that is substantially the same as or operates substantially the same as an encoder of a client system is identified. The encoder can be implemented through hardware or software. The adjustable parameters that can be adjusted in attempts to further optimize secondary conversion can be included in a list or database locally and/or remotely stored and associated with the components to be evaluated. Additionally and/or alternatively, the adjustable or variable parameters are identified and adjusted by operators.

In step 614, the process determines whether parameters and/or a processing log are available associated with the first formatted content. As introduced above, the source provider can record parameters associated with the conversion of the source content to the first formatted content. When such parameters and/or log are not available, the process continues to step 620. Alternatively, when such parameters and/or log are available, step 616 is entered where the system applies or sets the parameters and/or restricts the system from performing certain adjustments and/or processing (e.g., avoid applying a certain type of filtering, avoid applying further red-eye reduction when red-eye reduction has previously been applied, and other such parameters).

In step 620, at least a portion of the first formatted content is retrieved. Again, the content can be retrieved over the network 224, from a distributed medium 240, a combination of networked content and content from the medium, and other such sources. In some implementations, the secondary conversion is performed on portions or one or more segments of the content so that adjustments can be implemented and the portion can be re-converted to allow further evaluation of that portion of converted content to determine whether the adjustments were beneficial and/or whether additional adjustments would be further beneficial as described above and further below. In other implementations, however, the content is converted as a continuous stream and the adjustments are determined and/or implemented during the continuous conversion.

In step 622, the portion of content is parsed. As described above, in many instances, the first formatted content can contain a plurality of different content, such as video content, audio content, metadata content, still image content, other types of control content, and/or other content. The parsing of step 622 separates out those different types when appropriate to allow different secondary conversion for each type of content when that conversion is different. In some instances, however, the different types of content are to be converted to the same secondary format and thus the parse does not need to separate out those portions and step 622 can be skipped for some or all of the content. In step 624, the process determines whether a license, decryption key, or other authorization is needed to access the content. When a license is not needed, the process continues to step 632. Alternatively, step 630 is entered where one or more licenses and/or other authorization are retrieved. The license and/or authorization can be obtained from one or more sources, such as obtained with the first formatted content (e.g., from the medium), obtained over the network 224, obtained audibly (e.g., by telephoning a request for authorization), obtained from distribution materials distributed with the first formatted content (e.g., obtained with packaging of distributed medium), and other such methods and/or combinations of methods.

In some embodiments, the process 610 includes optional step 632 that evaluates and retrieves control and/or parameter data (e.g., metadata, adjustable parameter data and the like) to be applied while decrypting or otherwise obtaining access to content based on the authorization received in step 630. In step 634, the first formatted content is decrypted or otherwise made available using the license(s), key(s) and/or other authorization(s). In step 640, the process determines whether parameter data is available to be applied while decoding the content. If decode parameters are to be applied, step 642 is entered where the parameters are retrieved and applied. In step 644, the process 610 initiates the decode of at least the portion of the content and the decoded content is buffered.

In step 646, the process determines whether adjustable encode parameters are to be applied and/or adjusted for at least the portion of the content. The adjustments of the encode parameters are, in some implementations, received from the source provider determined when encoding the source content, and/or can be received based on evaluations of the secondary conversion. When parameters are not to be applied or adjusted the process continues to step 650. Alternatively, when parameters are to be applied and/or adjusted, step 648 is entered where the parameters are retrieved and applied to the encoder. In step 650, the process identifies and retrieves the first formatted content to be encoded, whether the content is a portion of content to be re-encoded with adjustments to parameters or continuing to encode the first formatted content. In step 652, at least the portion of content is encoded according to the configuration and/or parameters of the encoder.

In step 654, the process determines whether adjustments to the encoding parameters are to be implemented (e.g., bit rate, GOP structure defined, type of motion estimation to apply, filtering, type of noise reduction to apply, and/or other). When adjustments are not needed, the process continues to step 660. Alternatively in step 656, the adjustments to the parameters are received (e.g., from an evaluation system and/or operator) and implemented. In step 660, the process determines whether further content is to be encoded and/or re-encoded. When further encoding or re-encoding is to be performed the process returns to step 620 in some embodiments when portions of the first formatted content are evaluated, or to step 650 when the process operates on the stream of first formatted content. Alternatively, the process terminates.

The present embodiments evaluate the conversion to the destination format to determine whether adjustments are to be employed. The evaluation can be implemented through a system and/or through operator evaluation. In some implementations, the evaluation and adjustment of parameters is achieved in part through multi-pass encoding, where an initial encoding of content is performed. The encoded content is evaluated and parameter adjustments are identified, and the content is encoded applying the adjusted parameters. This process can be repeated any number of times. Some advanced transcoding/encoding systems allow segment based encoding and/or re-encoding, such that the multi-pass encoding can additionally and/or alternatively be performed through segment re-encoding. For example, segment based re-encoding as described in co-pending U.S. Provisional Patent Application Ser. No. 60/696,349, filed on Jul. 1, 2005, entitled METHOD, APPARATUS AND SYSTEM FOR USE IN MULTIMEDIA SIGNAL ENCODING, which is incorporated herein by reference in its entirety. Utilizing segment based re-encoding, a system and/or operator can adjust or tweak encoding parameters based on the review of encoded results, and re-encode the identified segment based on the adjusted parameters to further evaluate and/or confirm the adjustments to parameters. These parameters, as described above, can then be used to duplicate the advanced system encoding through a simpler client encoding system (e.g., simple encoding software running on consumer personal computers). The use by the client systems of the conversion and/or transcode control parameters can further make converting and/or transcoding faster than could otherwise be achieved through client systems, since parameters can be optimized for speed without loss of quality, such as motion vectors. For example, the parameters forwarded to the client systems can include motion vector information or motion estimation data that potentially can substantially speed up conversion and/or transcoding on the client systems.

As introduced above, in some implementations, the parameter data is provided to the client system as metadata. The metadata is associated with the content and can be distributed with the content and/or separate from the content. The content can be substantially any entity of data that is to be converted by a client system. An entity is a piece of data that can be stored on a computer readable medium. For example, an entity can include audio data, video data, graphical data, textual data, or other sensory information. An entity can be stored in substantially any media format, including, multimedia formats, file based formats, or other format that can contain information whether graphical, textual, audio, or other sensory information. Entities are available on disc based media, for example, DVDs, audio CDs, videotapes, laserdiscs, CD-ROMs, video game cartridges and other disc based media. Furthermore, entities are available on other types of computer readable medium, for example, a hard drive, a memory of a server computer, RAM, ROM, and the like. Furthermore, entities are available over one or more networks, for example, the Internet, WAN, LAN, digital home network, and/or other such networks. In some embodiments, the adjustment parameter data for use in converting an entity can be retained as metadata associated with one or more entities. Examples of entity metadata are further described herein at least with reference to FIG. 8.

As referred to herein, a collection includes a plurality of entities and collection metadata. The collection metadata can define properties of the collection and how the plurality of entities are related within the collection. Collection metadata is further defined herein at least with reference to FIGS. 7-9, and in co-pending U.S. patent application Ser. No. 10/860,351, filed Jun. 2, 2004, entitled PERSONALIZATION SERVICES FOR ENTITIES FROM MULTIPLE SOURCES, incorporated herein by reference in its entirety.

Figure 7:
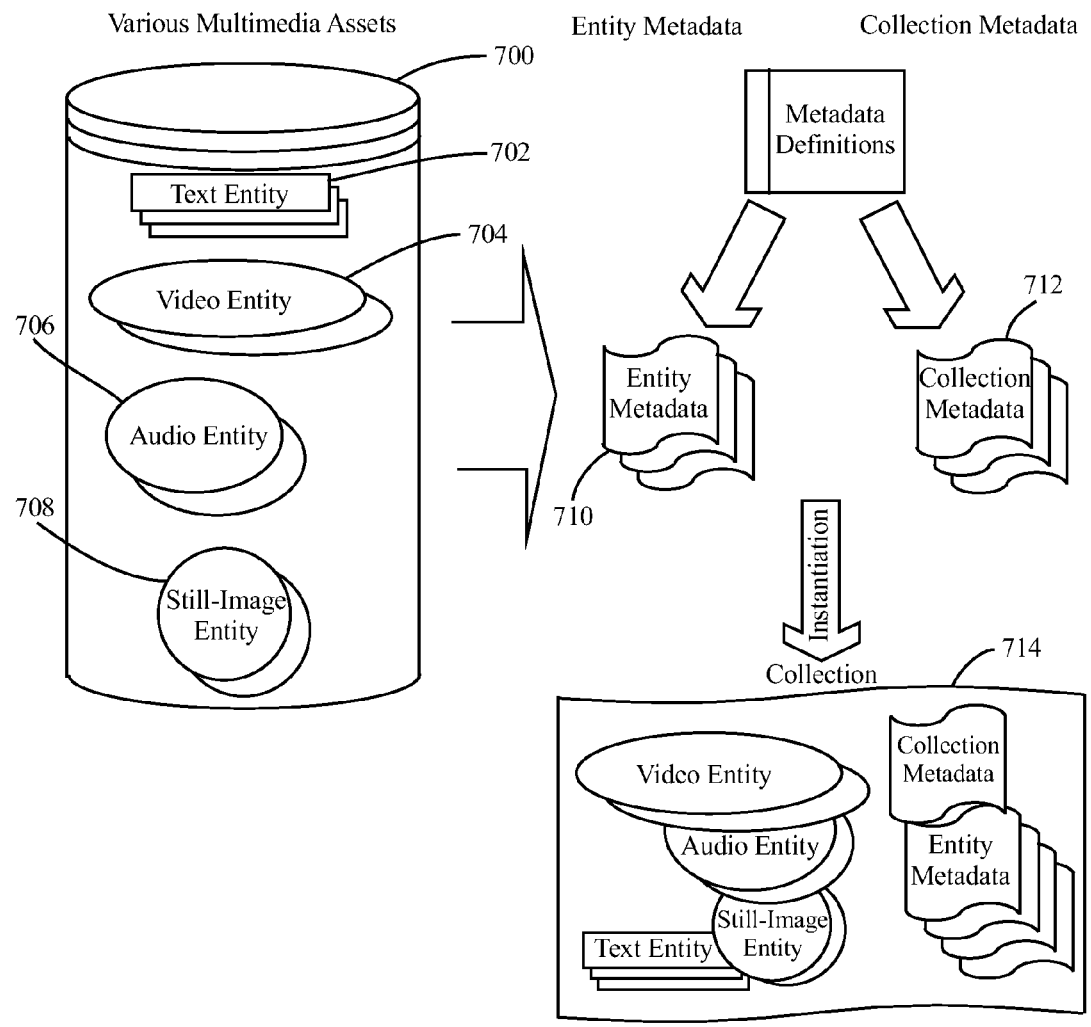
FIG. 7 depicts an example of the relationship between an entity, a collection, entity metadata, and collection metadata.

Referring to FIG. 7, shown is a depiction of one example of the relationship between an entity, a collection, entity metadata, and collection metadata. Shown is a storage area 700 containing multiple entities. Within the storage area is a text entity 702, a video entity 704, an audio entity 706 and a still image entity 708. Also shown are the entity metadata 710, the collection metadata 712 and a final collection 714. The final collection 714 includes the text entity 702, the video entity 704, the audio entity 706, the still image entity 708, the entity metadata 710, and the collection metadata 712.

The collection metadata 712 can be generated at the time of creation of the collection and can be done by the content provider 212, content manager, manually, and/or through other sources. The content provider and/or manager can also create a collection from another collection by gracefully degrading it or modifying it. The collection metadata can be static, dynamic and/or behavioral.

A content services module utilizes a collection of entities for playback. A collection is made up of one or more entities. FIG. 7 shows an example of a hierarchy of a collection to an entity. In one embodiment an entity can be any media, multimedia format, file based formats, streaming media, or anything that can contain information whether graphical, textual, audio, or sensory information. In another embodiment an entity can be disc based media including DVDs, audio CDs, videotapes, laserdiscs, CD ROMs, or video game cartridges. To this end, DVD has widespread support from numerous major electronics companies, numerous major computer hardware companies, and numerous major movie and music studios. In addition, new formats disc formats such as High Definition DVD (HD-DVD), Advanced Optical Discs (AOD), and Blu-Ray Disc (BD, as well as new mediums such as Personal Video Recorders (PVR) and Digital Video Recorders (DVR) are just some of the additional mediums that can be used. In another form entities can exist on transferable memory formats from floppy discs, Compact Flash, USB Flash, Sony Memory Sticks, SD_Memory, MMC formats, and the like. Entities may also exist over a local hard disc, a local network, a peer-to-peer network, a WAN, the Internet or the like.

In accordance with some embodiments, the entities can include both content and metadata. The entities can be cooperated and/or gathered, and in some embodiments are gathered by a content search engine. The entities are then instantiated into a collection. For example, in object-oriented programming, instantiation produces a particular object from its class template. This involves allocation of a structure with the types specified by the template, and initialization of instance variables with either default values or those provided by the class's constructor function. In accordance with some embodiments, a collection is created that includes the video entity 704, the audio entity 706, the still image entity 708, the text entity 702, the entity metadata 710 for each of the aforementioned entities, and the collection metadata 712.

An entire collection can be stored locally or parts of the entities can be network accessible. In addition entities can be included into multiple collections.

Figure 8:
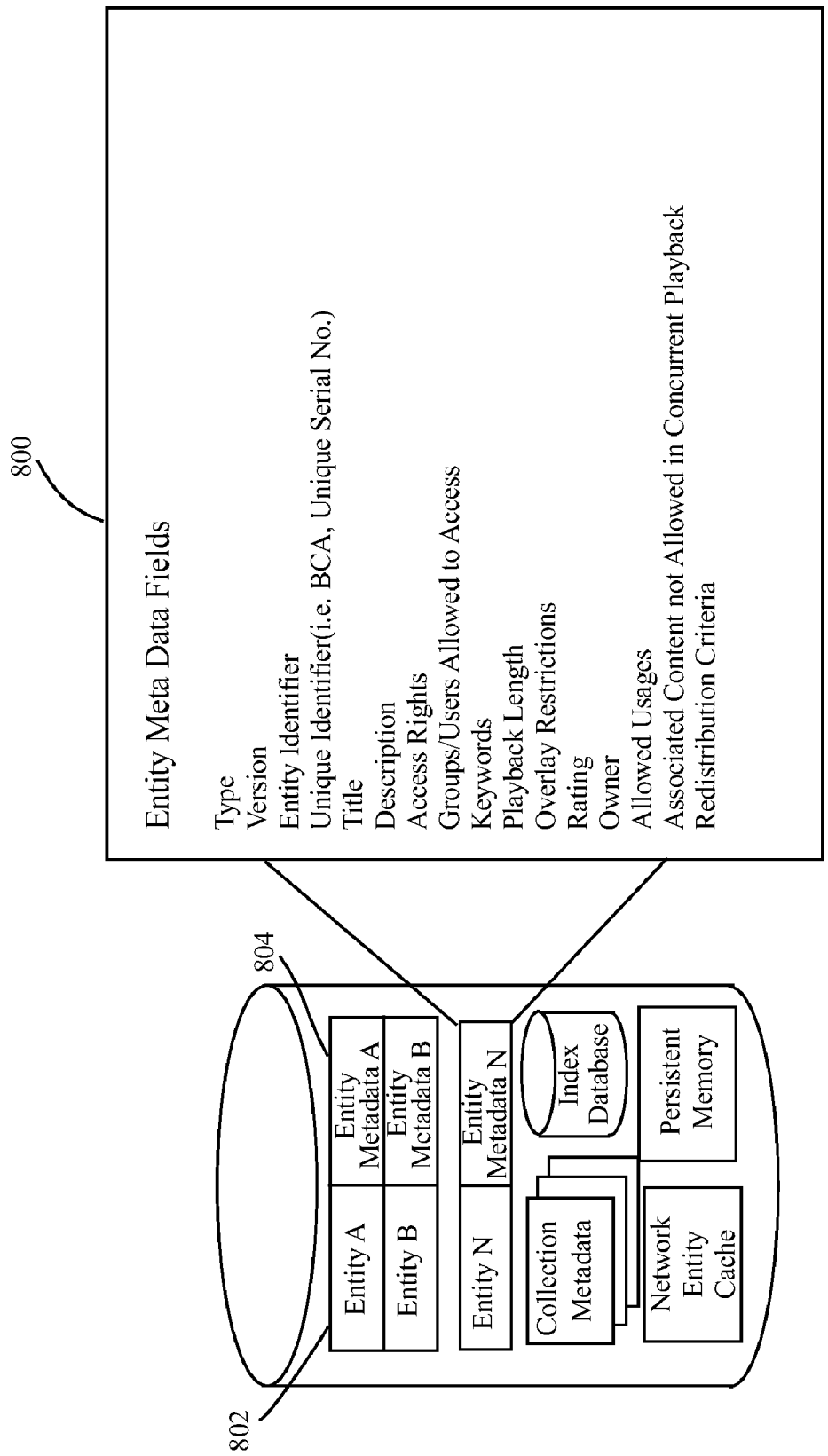
FIG. 8 shown is a conceptual diagram illustrating one example of metadata fields for one of the various entities.

Referring to FIG. 8 shown is a conceptual diagram illustrating one example of metadata fields 800 for one of the various entities 802. Along with each entity is associated metadata 804. The metadata 804 has various categories for which it describes the entity.

In some embodiments the entity metadata may be contained in an XML file format or other file format separate from the entity file. In other embodiments it may be within the header of the entity file. The entity metadata may be part of the entity itself or in a separate data file from where the entity is stored.

The entity metadata may be stored on a separate medium or location and some present embodiments can identify the disc through an entity identifier or media identifier and then pass the identifier to a separate database that looks up the identifier and returns the entity's metadata, e.g., an XML description file.

The entity metadata is used to describe the entity it is associated with and to define parameters for use in conversion. In accordance with the present embodiments, the entity metadata can be searched using a search engine. Additionally, a content management system can use the metadata in the creation of collections and use the metadata to determine how each of the entities within a collection will be displayed on the presentation device.

In one example, a system can include a presentation device having a 16:9 aspect ration. The source provider may wish to create a collection of content (e.g., collection Bruce Lee's greatest fight scenes). The content management system does a search and finds different entities that are available, either on an available portable storage medium, the local storage medium, or on any remote storage medium. The content management system identifies the available entities on each storage medium and creates a collection based upon the metadata associated with each entity and optionally also the content of each entity. In creating the collection, the system attempts to find entities that are best displayed on a presentation device with a 16:9 aspect ratio. If an entity exists that has a fight scene, but it is not available in the 16:9 version, the content manager then substitutes this entity with, e.g., the same fight scene that is in a standard television format.

In addition to scenes from a movie, the content management system may also include in the collection still pictures from the greatest fight scenes. In yet another embodiment, the collection can include web-pages discussing Bruce Lee or any other content related to Bruce Lee's greatest fight scenes that are available in any form. A presentation layout manager along with the playback runtime engine then determines how to display the collection on the presentation device.

In accordance with some present embodiments there can be different categories of metadata. One example of a category of metadata is static metadata. The static metadata is data about the entity that remains constant and does not change without a complete regeneration of the entity. The static metadata can include all or a portion of the following categories, for example: Format or form of raw entity (encoder info, etc—ex: AC3, MPEG-2); Conditions for use; IP access rights, price—(ex: access key); paid, who can use this based on ID; Ratings and classifications—(ex: parental level; region restrictions); Context data—(ex: when/where recorded; set or volume information); One example of metadata for audio content can include: a=artist, c=album (CD) name, s=song, l=record label and L=optional record label; Creation and/or production process info—(ex: title, director, etc.); and Rules of usage regarding presentation (unchangeable as per the collection owner) including, for example, layouts, fonts and colors.

Another example of a category of metadata is dynamic metadata. The dynamic metadata is data about the entity that can change with usage and can be optionally extended through additions. The dynamic metadata can include all or a portion of the following categories, for example:

Historical and factual info related to usage—(ex: logging for number of times used (royalty related—copyright usage, distribution limitations) or for rental type transaction (e.g. Divx)); Segmentation information—(ex: scene cuts described by static metadata data info (like the G rated version etc) with start/end time codes and textual index info to allow search ability); User preferences and history—(ex: learn uses over time by user to note patterns of use with this collection (versus patterns of use associated with the user ID like TiVo may do)); and Rules of usage regarding presentation (changeable and extendable) including, for example, layout, fonts and colors.

Yet another type of metadata can be behavioral metadata. The behavioral metadata is the set of rules or instructions that specify how the entities are used together in a collection (built upon the static and dynamic metadata information). The behavioral metadata can include all or a portion of the following categories, for example: A script of a presentation of the collection—for example, a G rated version of the collection is constructed using static metadata describing scenes ("Love Scene" starts at time code A and stops at B) and rules which specify layout or copyright requirements (e.g., must be played full screen); A playlist of the collection—(ex: a scene medley of all the New Zealand scenery highlights from "Lord of the Rings"); and A presentation of the collection defined by the title's Director to highlight a cinemagraphic technique.

The parameter data for use in converting (e.g., transcoding) content can include static metadata, dynamic metadata, behavioral metadata, and/or other types of metadata, settings and/or parameters. In one implementation the collection metadata is implemented in an XML file or XML files. In other implementations the collection metadata is in other formats such as part of a playlist. Some examples of playlist formats for Audio are: (M3U, PLS, ASX, PLT, LST).

Figure 9:
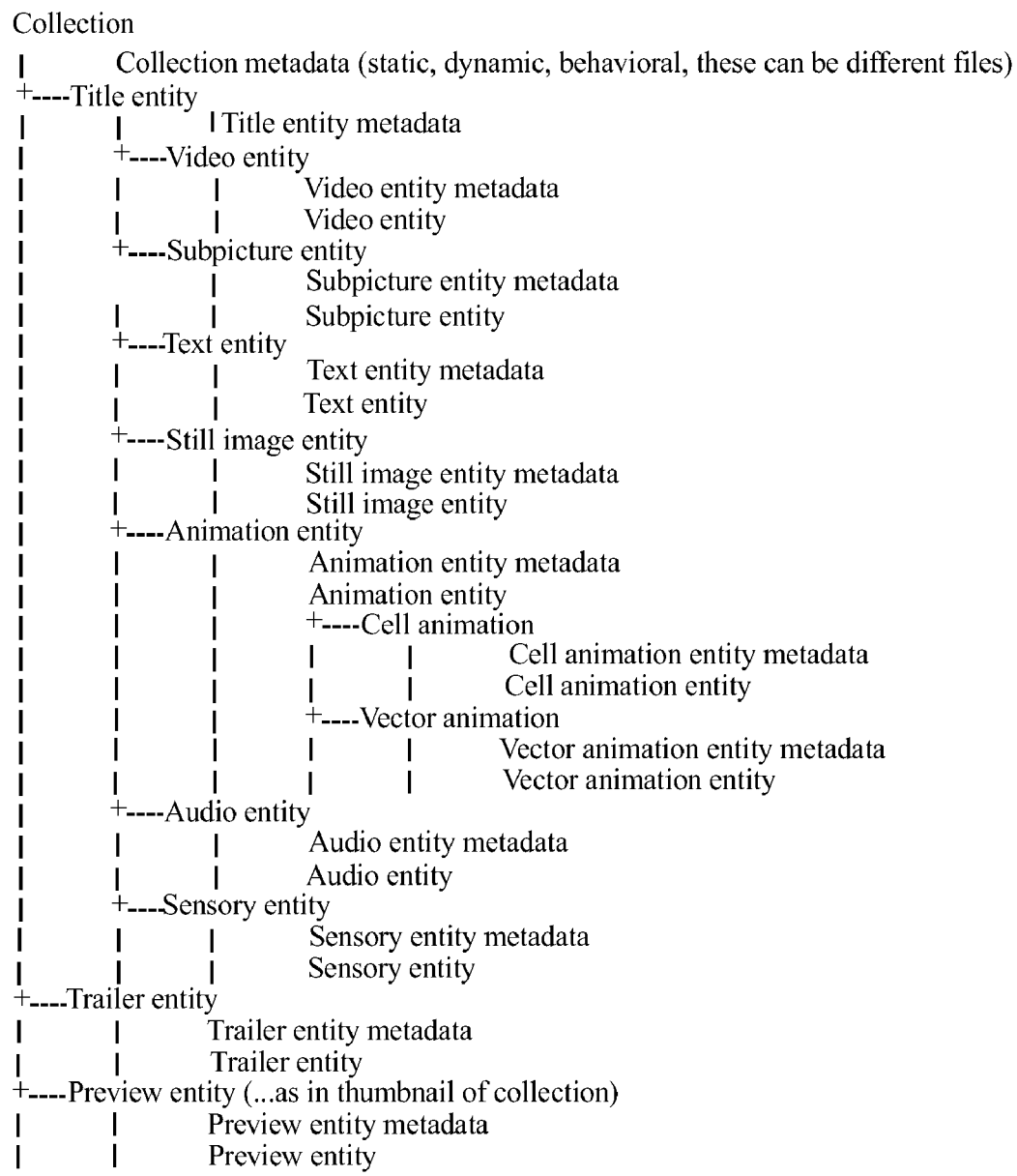
FIG. 9 is a conceptual diagram illustrating one embodiment of a collection.

In accordance with some embodiments, a search engine can perform a metadata search in order to find parameters. The content management system can include the entities in a collection either by storing them to the local storage medium or simply including them from where the entities are currently stored. The parameters and/or metadata can be accessed and used across collections in a library such that a search can made against a library much like the UNIX "grep" command. For many uses, a text search is sufficient; however, pattern or other search technologies can be used against the parameters or entities. In another embodiment, multiple collections can be retrieved and then entities from the multiple collections can be combined to make a new collection. Referring to FIG. 9 a conceptual diagram is shown illustrating one embodiment of a collection. The collection includes the collection metadata (e.g., static, dynamic and behavioral), entities (e.g., title, video, sub-picture, text, still image, animation, audio, sensory, trailer and preview) and entity metadata associated with each of the entities.

The present embodiments can additionally and/or alternatively be utilized for upconverting content, for example, from a standard resolution video content to high definition resolution following a down conversion of source content to a lower resolution for distribution. The parameter data 148 can further include information that define algorithms that should be applied on a particular source video by knowing what conversions have already taken place on the source content. For example with digital images or photos, when the parameter set can include information defining that red-eye removal has already been applied to the photo, then this parameter information can be saved as part of the key set of parameters to limit or avoid further degradation by a client system trying to apply red-eye removal again. Similarly with music content, additional information in the parameter set can include information that particular filters that have been applied or filter coefficients to be used for converting from a source format (e.g., audio CD) to an intermediate format (e.g., to MP3 format) and then converted from the intermediate format to a destination format (e.g., to OOG or advanced audio coding (AAC) or for converting an MP3 file back to a Red Book Audio CD format). Additional parameter information can also be stored during an original copying or ripping process of the source content to improve the quality later when recordings are created (e.g., audio CDs are created from mp3 files). The optimization parameters can also be used for conversion from multichannel audio (>2) to stereo and back to multichannel audio. As a further example, high definition source content can be converted to a standard definition as the source end for distribution along with conversion parameters for use in converting at the client end as determined by the conversion optimization system 126 for converting from standard definition back to the high definition or close to the high definition quality of the source content. As yet a further example, the source content can be obtained from a storage medium (e.g., a DVD) and converted to an intermediate format that allows the content to be more easily communicated over a distributed network while recording the parameter data for performing the conversion. The parameters can be distributed to the remote client systems such that the client systems can convert the content in the intermediate format back to the source DVD format. Supplemental and/or upgrades to content can be distributed through similar conversions with parameter data.

The number and types of electronic consumer devices that utilize multimedia content has drastically increased over the last decade and continues to increase. Further, with the portability of these devices and digital home networks, each device often employs a conversion to different formats. As media is repeatedly transcoded, the quality of the content can continue to degrade over time due to the lossy nature of most transcoding processes. The present embodiments, however, provide information and/or parameters that can be used multiple times through this multiple transcoding and future transcoding processes to help maintain the quality of the content. Further, additional parameter data can be added to already existing parameter data associated with each successive conversion to maintain enhanced results.

For example, the present embodiments can be employed with communicated audio data. In some audio communication systems, the audio content goes through multipass encode/decodes between the source and the destination (e.g., conversion of speech to LDPCM, to A satellite speech encoding algorithm such as CELP, to another public switch network that may be digital, to a cell phone user on a GSM network using the GSM speech compression). Each conversion can result in degradation of the content and degradation can be further compounded with each subsequent conversion. Some limited systems, such as from cellular to cellular communications, attempt to solve this problem of multiple conversions degradations by avoiding multiple encodes/decodes by maintaining the content in a single format (e.g., maintaining the signal digital and compressed in the same format throughout the system and flag it as such). However, this cannot be performed in many systems and with many types of content. The present embodiments of generating parameter data associated with the previous conversion and/or optimization of de-conversion, and forwarding the parameter data to subsequent conversion systems allows subsequent conversion systems to utilize the parameter data to optimize the conversion and re-conversion. The re-conversion can add further parameter data to be forwarded for subsequent conversion to further improve and/or optimize subsequent conversions. Additionally and/or alternatively, a log of conversions, previous processing, filtering, and/or adjustments applied to content during multiple conversions can be maintained to notify future conversion systems of adjustments and/or changes to parameters previously applied (e.g., filtering, adjustments to brightness, contrast, color balance, and other such adjustments and previous processing).

Similarly, the present parameter data can include authorizing parameter data, settings and/or information that can be later used upon conversion and/or re-authoring. For example, the parameter data can include playback structures, assets and the like as described in co-pending U.S. patent application Ser. No. 10/123,816 (Publication No. 2003/0193520), filed Apr. 15, 2002, entitled "INTERACTIVE MEDIA AUTHORING WITHOUT ACCESS TO ORIGINAL SOURCE MATERIAL", and U.S. patent application Ser. No. 10/408,027 (Publication No. 2003/0227474), filed Apr. 3, 2003, entitled "OPTIMIZING THE RECORDING ON A REWRITABLE INTERACTIVE MEDIUM OF REVISIONS TO AN EXISTING PROJECT ON THAT MEDIUM", both incorporated herein by reference in their entirety. Further, the parameter data can be utilized for converting and recording content as described in co-pending U.S. patent application Ser. No. 10/987,446, filed Nov. 12, 2004, entitled "SECURE TRANSFER OF CONTENT TO WRITABLE MEDIA", incorporated herein by reference in its entirety.

The present embodiments for controlling remotely the parameters of a client system to provide deterministic conversion (e.g., encoding) while providing flexibility in varying the parameters of the client-side conversion, preprocessing at a source or head end to speed up final conversion at the client system, performing preprocessing steps of multi-pass conversion at the source or head end so that the client system can produce a converted content that meets a multipass equivalent in a single pass. The parameters can further be utilized in transcoding, where preprocessing optimizes, for example, the conversion between encoding formats with partial decode/re-encode. Further, the present embodiments allow source providers to employ better compression techniques and/or employ greater compression rates while still allowing client systems to achieve an enhanced and/or optimized conversion by employing the parameters at the client systems.

As introduced above, some client systems obtain a license or authorization keys that are used to access protected content. The parameter data 148 can similarly be protected such that only client systems authorized to utilize the parameter content can access and use the parameters. The source provider may encrypt or otherwise protect the parameter data and store the parameter data on the medium 240 with the content. A client system 124, however, will be unable to utilize the parameter data unless the client system obtains the license(s) and/or key(s). For example, the source provider may require additional payment to receive the parameters, or the parameters may be protected to limit or prevent counterfeit copying of the content. The source provider may intentionally include a degenerative encoding, add a watermark, or otherwise degrade the content, where the degenerative effect can be reversed with the parameter data defining how the degenerative effect is to be reversed. Thus, the parameter data can provide additional protection against counterfeiting and/or unauthorized access to quality content. The parameter data can additionally be employed by digital video recorders (DVR) to simplify the conversions at the DVRs and/or allow enhanced content (e.g., converting from standard definition to high definition content or DVD).

While the invention herein disclosed has been described by means of specific embodiments and applications thereof, numerous modifications and variations could be made thereto by those skilled in the art without departing from the scope of the invention set forth in the claims.

What is claimed is:

1. A method for use in converting multimedia content, comprising:
   receiving media data in a first format;
   initiating a first conversion of the media data at the first format to a second converted format;
   evaluating the media data converted to the second converted format;
   identifying, in accordance with the evaluation of the media data converted to the second converted format, parameters dictating the conversion to the second converted format;
   recording the parameters;
   distributing the recorded parameters to remote systems such that the parameters at least in part control the remote systems during a conversion, at the remote systems, of the media data to the second converted format; and
   determining a quality of a first portion of the media data in the second converted format converted while applying a first parameter having a first state;
   wherein the identifying the parameters comprises adjusting the first parameter to a second state that is different than the first state, wherein the adjusted first parameter improves data quality of at least the first portion of the media data when the first portion of the media data is converted to the second format upon a subsequent conversion of the first portion of the media data in the first format to the second converted format while applying at least the adjusted first parameter; and
   wherein the recording the parameters comprises recording the adjusted first parameter;
   wherein the identifying the parameters further comprises determining whether the first portion of the media data in the second converted format, converted to the second converted format while applying the adjusted first parameter in the second state, has a quality that exceeds a quality of the first portion of the media data in the second converted format when converted to the second converted format while applying the first parameter in the first state; and
   wherein the recording the parameters comprises recording the adjusted first parameter when the first portion of the adjusted media data in the second converted format, converted to the second converted format while applying the adjusted first parameter in the second state, has a quality that exceeds the quality of the first portion of the media data in the second converted format when converted to the second converted format while applying the first parameter in the first state.

2. The method of claim 1, wherein the identifying the parameters comprises adjusting a set of parameters, prior to the recording of the parameters, to improve the conversion of the media data from the first format to the second converted format; and
   wherein the recording the parameters comprises recording the adjusted set of parameters.

3. The method of claim 2, wherein the adjusting the set of parameters comprises adjusting video parameters that are utilized to optimize a generation of a video image upon encoding of the media data to the second converted format.

4. The method of claim 1, wherein the identifying the parameters comprises adjusting a second parameter, prior to the recording the parameters, to enhance conversion of the media data to the second converted format;

initiating the subsequent conversion of at least the first portion of the media data in the first format to the second converted format while applying the adjusted first and second parameters;

determining whether the quality of at least the first portion of the media data converted to the second converted format during the subsequent conversion has been enhanced relative to at least the first portion of the media data converted to the second converted format achieved during the first conversion; and wherein the recording comprises recording the adjusted parameter.

5. The method of claim 1, wherein:

the identifying the parameters comprises adjusting a second parameter, where the adjusted second parameter improves data quality of a second portion of the media data when the second portion of the media data is converted to the second format upon a subsequent conversion of the second portion of the media data to the second converted format while applying at least the adjusted second parameter; and the recording the parameters comprises recording the adjusted first parameter in relation to the first portion of the media data and recording the adjusted second parameter in relation to the second portion of the media data.

6. The method of claim 1, wherein the receiving media data in the first format comprises receiving the media data in an original source format.

7. The method of claim 1, wherein the distributing the recorded parameters comprises distributing the recorded parameters with the media data to the remote systems.

8. The method of claim 1, wherein the distributing the recorded parameters comprises streaming the recorded parameters over a network to the remote systems communicationally coupled with the network.

9. The method of claim 1, wherein the initiating the first conversion comprises decoding at least the first portion of the media data producing decoded media data and encoding the decoded media data according to the second format; and the evaluating the media data comprises decoding the the media data in the second converted format and determining the quality of the decoded the media data from the second converted format.

10. The method of claim 1, further comprising:

receiving an initial set of parameters associate with the media data in the first format; and applying the initial set of parameters during the first conversion.

11. The method of claim 10, further comprising:

reviewing the initial set of parameters following the evaluating of the media data converted to the second converted format;

determining that a second parameter is set in the initial set of parameters; and preventing action relative to the second parameter.

12. A method for use in converting multimedia content, comprising:

receiving media data in a first format;

initiating a first conversion of the media data at the first format to a second converted format;

evaluating the media data converted to the second converted format;

identifying, in accordance with the evaluation of the media data converted to the second converted format, parameters dictating the conversion to the second converted format;

recording the parameters;

distributing the recorded parameters to remote systems such that the parameters at least in part control the remote systems during a conversion, at the remote systems, of the media data to the second converted format; and determining a quality of a first portion of the media data in the second converted format converted while applying a first parameter having a first state;

wherein the identifying the parameters comprises adjusting the first parameter to a second state that is different than the first state, wherein the adjusted first parameter improves data quality of at least the first portion of the media data when the first portion of the media data is converted to the second format upon a subsequent conversion of the first portion of the media data in the first format to the second converted format while applying at least the adjusted first parameter; and wherein the recording the parameters comprises recording the adjusted first parameter;

wherein the identifying the parameters further comprises:

initiating a segment re-encode of at least the first portion of the media data at the first converted format to the second converted format while applying the adjusted first parameter in the second state; and determining whether the re-encoded first portion of the media data, re-encoded while applying the adjusted first parameter in the second state has a quality that exceeds the quality of the first portion of the media data in the second converted format when converted to the second converted format while applying the first parameter in the first state.

13. The method of claim 12, further comprising:

converting the media data in the first format to a third converted format; and the distributing comprises distributing the recorded parameters and the media data in the third converted format to the remote systems to be used by remote systems in playing back the media data.

\* \* \* \* \*